(12) United States Patent
Peled et al.

(10) Patent No.: US 8,141,159 B2
(45) Date of Patent: Mar. 20, 2012

(54) METHOD AND SYSTEM FOR PROTECTING CONFIDENTIAL INFORMATION

(75) Inventors: Ariel Peled, Even-Yehuda (IL); Lidror Troyansky, Givataim (IL); Ofir Carny, Kochav-Yair (IL)

(73) Assignee: PortAuthority Technologies Inc., San Diego, CA (US)

( * ) Notice: Subject to any disclaimer, the term of this patent is extended or adjusted under 35 U.S.C. 154(b) by 1111 days.

(21) Appl. No.: 10/748,178

(22) Filed: Dec. 31, 2003

(65) Prior Publication Data

US 2005/0066165 A1 Mar. 24, 2005

Related U.S. Application Data

(60) Provisional application No. 60/437,031, filed on Dec. 31, 2002.

(51) Int. Cl.
*G06F 17/30* (2006.01)
(52) U.S. Cl. .............................. 726/26; 726/1; 726/27
(58) Field of Classification Search ................ 726/1, 26, 726/27; 709/223–225
See application file for complete search history.

(56) References Cited

U.S. PATENT DOCUMENTS

| | | | | |
|---|---|---|---|---|
| 5,347,653 A * | 9/1994 | Flynn et al. | ...................... | 707/695 |
| 5,638,443 A * | 6/1997 | Stefik et al. | ...................... | 705/54 |
| 5,699,427 A * | 12/1997 | Chow et al. | ...................... | 705/58 |
| 5,715,403 A * | 2/1998 | Stefik | ............................ | 705/44 |
| 5,731,805 A | 3/1998 | Tognazzini et al. | | |
| 5,892,900 A * | 4/1999 | Ginter et al. | ...................... | 726/26 |
| 5,903,647 A * | 5/1999 | Ronning | ........................... | 705/57 |
| 6,012,033 A * | 1/2000 | Vanden Berge | .................. | 705/1 |
| 6,148,342 A * | 11/2000 | Ho | ................................. | 709/225 |
| 6,205,472 B1 * | 3/2001 | Gilmour | ........................ | 709/206 |
| 6,299,308 B1 | 10/2001 | Voronka et al. | | |
| 6,445,822 B1 * | 9/2002 | Crill et al. | ...................... | 382/218 |
| 6,651,108 B2 * | 11/2003 | Popp et al. | ...................... | 719/315 |
| 6,662,225 B1 * | 12/2003 | Motoyama et al. | ........... | 709/224 |
| 6,772,340 B1 * | 8/2004 | Peinado et al. | ............... | 713/168 |
| 6,854,016 B1 * | 2/2005 | Kraenzel et al. | .............. | 709/229 |
| 6,920,453 B2 * | 7/2005 | Mannila et al. | ........................ | 1/1 |
| 7,140,035 B1 * | 11/2006 | Karch | ................................ | 726/1 |
| 7,155,668 B2 * | 12/2006 | Holland et al. | ............... | 715/256 |
| 7,162,635 B2 * | 1/2007 | Bisbee et al. | ................. | 713/176 |
| 7,178,033 B1 * | 2/2007 | Garcia | .......................... | 713/184 |
| 7,322,047 B2 * | 1/2008 | Redlich et al. | .................. | 726/27 |

(Continued)

FOREIGN PATENT DOCUMENTS

WO WO 02/103461 12/2002

OTHER PUBLICATIONS

Venners, Bill. "Java-Security: How to Install the Security Manager and Customize Your Security Policy" Java World, Nov. 30, 1997 (5 pages).*
LaMonica, Martin. "Cnet News: Sun to give StarOffice Java flavor" Published Nov. 27, 2002 (2 pages) http://news.cnet.com/2100-1001-975529.html.*

(Continued)

*Primary Examiner* — Kim Vu
*Assistant Examiner* — Thomas Gyorfi

(57) ABSTRACT

A method for computer workstation based information protection is presented, the method comprises: a) monitoring user's actions on the computer workstation, b) analysis of the actions in respect to a pre-defined policy to determine whether the actions prejudice information to which the policy applies, and c) executing the policy in accordance with the results of the analysis to prevent or modify or restrict or monitor or log the actions.

102 Claims, 15 Drawing Sheets

U.S. PATENT DOCUMENTS

| | | | | |
|---|---|---|---|---|
| 7,370,366 | B2* | 5/2008 | Lacan et al. | 726/28 |
| 7,373,659 | B1* | 5/2008 | Vignoles et al. | 726/11 |
| 7,516,475 | B1* | 4/2009 | Chen et al. | 726/1 |
| 7,546,629 | B2* | 6/2009 | Albert et al. | 726/1 |
| 2002/0010743 | A1* | 1/2002 | Ryan et al. | 709/205 |
| 2003/0051165 | A1* | 3/2003 | Krishnan et al. | 713/201 |
| 2003/0177187 | A1* | 9/2003 | Levine et al. | 709/205 |
| 2003/0177389 | A1* | 9/2003 | Albert et al. | 713/201 |
| 2003/0200435 | A1* | 10/2003 | England et al. | 713/172 |
| 2004/0045010 | A1* | 3/2004 | Kondo et al. | 719/316 |

OTHER PUBLICATIONS

Haugland, Solveig et al. "StarOffice™ 6.0 Office Suite Companion" © 2002 Prentice Hall Inc. excerpt from Ch. 2 (19 pages).*

Elias Levy. "Executing Java Programs Securely" Published May 1, 2000 (5 pages) http://www.networkcomputing.com/1108/1108ws3.html#.*

John Barkley. "Principle of Least Privilege" Published Jan. 9, 1995 (1 page) http://hissa.ncsl.nist.gov/rbac/paper/node5.html.*

* cited by examiner

METHOD AND SYSTEM FOR PROTECTING CONFIDENTIAL INFORMATION

CROSS-REFERENCE TO RELATED APPLICATIONS

This application is related to and claims priority from U.S. Provisional Patent Application No. 60/437,031, filed Dec. 31, 2002, the contents of which are hereby incorporated herein by reference in their entirety.

FIELD OF THE INVENTION

The present invention relates generally to the field of securing digital content. More specifically but not exclusively, the present invention deals with methods for protecting confidential digital information utilizing a software client.

BACKGROUND OF THE INVENTION

The information and knowledge created and accumulated by organizations and businesses are most valuable assets. As such, managing and keeping the information and the knowledge inside the organization is of paramount importance for almost any organization, government entity or business, and provides a significant leverage of its value. Most of the information in modern organizations and businesses is represented in a digital format. Digital content can be easily copied and distributed (e.g., via e-mail, instant messaging, peer-to-peer networks, file-transfer-protocol (FTP), portable media and web-sites), which greatly increase hazards such as business espionage and data leakage.

Some of the actions performed by a user on her or his computer, such as saving a confidential document under another name, copy some of the information to another document, printing the document and copying or moving a file that contain confidential information to portable media, may not comply with the organizational policy regarding confidential information and may cause a harmful leakage of confidential information. In order to monitor and control such actions special protection measures should be taken.

Prior art solutions attempt several approaches, such as;
Filtering the digital traffic using key-word filtering (e.g., not allowing distribution of documents with the word "confidential" in them). These methods tend to be either over-exclusive or over-inclusive, and therefore causing a high false-alarm rate and many miss-detections.
Considering the binary signature of the file, which critically depends on the precise representation of the data.
Utilizing specialized digital rights management software, which allows handling confidential file only within a specialized protected environment. Such solutions tend to be cumbersome, and are, in general, not compatible with the regular organizational workflow. This drawback greatly limited the current distribution of the digital rights management solution.

Another problem that greatly limits the security level provided by current information protection methods and techniques are cameras, and more specifically and not exclusively digital cameras: the proliferation of digital cameras, in particularly digital cameras that are attached to cellular phones, cause a severe breach in the security policy, since it is easy to take a photograph of the screen and disseminate it in an unauthorized manner.

There is thus a recognized need for, and it would be highly advantageous to have, a method and system that allow for a secure handling of digital documents and other digital information assets, which will overcome the drawbacks of current methods as described above.

SUMMARY OF THE INVENTION

In a first aspect of the present invention, a method for computer workstation based information protection is presented, the method comprising:
 a) monitoring user's actions on the computer workstation,
 b) analysis of the actions in respect to a pre-defined policy to determine whether the actions prejudice information to which the policy applies, and
 c) executing the policy in accordance with the results of the analysis to prevent or modify or restrict or monitor or log the actions.

In another preferred embodiment of the present invention, the policy comprises restrictions on at least one of the following actions: print save, copy, autosave, fax.

In another preferred embodiment of the present invention, the monitoring the user's actions on the workstation comprises detection of indications of attempts at tampering.

In another preferred embodiment of the present invention, the detection of indications of attempts at tampering comprises obtaining logical indications or statistical indications.

In another preferred embodiment of the present invention, the detection of indications of attempts of tampering comprises detection of at least one un-certified add-in.

In another preferred embodiment of the present invention, the detection includes noting that the un-certified add-in is hooked to events of a local operating system.

In another preferred embodiment of the present invention, the detection of indications of attempts at tampering comprises detection of at least one debugging technique.

In another preferred embodiment of the present invention, the debugging technique comprises use of any of:
 a debugger,
 a virtual machine,
 a software emulator,
 a software trap, and
 a remote administration tool.

In another preferred embodiment of the present invention, the policy comprises restrictions of actions made available to the user upon the detection of indications of attempts of tampering.

In another preferred embodiment of the present invention, the restrictions of user's actions upon the detection of indications of attempts of tampering comprise applying restrictions on actions within a software application operable to process the information.

In another preferred embodiment of the present invention, the execution of the policy comprises performing at least one action upon detection of indications of attempts of tampering.

In another preferred embodiment of the present invention, the actions comprise at least one of the following: encrypting at least one buffer, and encrypting at least one shared memory.

In another preferred embodiment of the present invention, the actions comprise preventing the decryption of encrypted digital content.

In another preferred embodiment of the present invention, the pre-defined policy is defined with respect to a software application on the user's workstation.

In another preferred embodiment of the present invention, the policy comprises reporting about attempts to perform actions that do not comply with an organizational policy or about attempts to perform actions that are suspected to not comply with the organizational policy.

In another preferred embodiment of the present invention, the policy comprises performing logging of attempts to perform actions that that do not comply or are suspected to not comply with the organizational policy.

In another preferred embodiment of the present invention, the information protection comprises protecting information held within a software data processing application able to process the information.

In another preferred embodiment of the present invention, the software data processing application operates in conjunction with a software client.

In another preferred embodiment of the present invention, the software client is a tamper-resistant software client.

In another preferred embodiment of the present invention, the software client is operable to monitor the user's actions and to execute the policy.

In another preferred embodiment of the present invention, the software client is operable to detect information based on statistical identifiers residing in a specialized database.

In another preferred embodiment of the present invention, the software client is further operable to detect events of the software application.

In another preferred embodiment of the present invention, the events comprise events required for any of:
  printing the information;
  copying the information;
  storing the information, and
  displaying the information.

In another preferred embodiment of the present invention, the policy further comprising managing usage rights.

In another preferred embodiment of the present invention, the usage rights are determined according to any of:
  the classification of the document;
  the classification level of the user, and
  the authentication level of the user.

In another preferred embodiment of the present invention, the usage rights comprise any of:
  viewing at least part of the information;
  modifying at least part of the information;
  sending at least part of the information to a recipient;
  storing at least part of the information;
  storing at least part of the information by an application;
  storing at least part of the information by a file system;
  storing at least part of the information in a portable device;
  storing at least part of the information in a removable media;
  storing at least part of the information portable storage device that is connected to the workstation using a USB port;
  pasting at least part of the information into a document;
  printing at least part of the information;
  printing at least part of the information to file;
  printing at least part of the information to a fax, and
  printing a screen view document.

In another preferred embodiment of the present invention the policy further comprises definitions of actions to be performed.

In another preferred embodiment of the present invention, the actions comprise any of:
  enabling usage of at least part of the information;
  disabling usage of at least part of the information;
  restricting the usage of at least part of the information, according to a pre-determined set of restrictions;
  reporting about the usage of at least part of the information, and monitoring the usage of at least part of the information.

In another preferred embodiment of the present invention, the restriction of usage imposes requiring encryption of at least part of the protected information.

In another preferred embodiment of the present invention, the required encryption is such that corresponding encrypted information can be decrypted only by a secure client.

In another preferred embodiment of the present invention, the restriction of usage requires the protected information to reside on a secure server.

In another preferred embodiment of the present invention, comprising arranging a connection between the secure server and the workstation such that the transport between the secure server and the workstation is protected.

In another preferred embodiment of the present invention, the protected transport comprises an encrypted transport.

In another preferred embodiment of the present invention, the encryption of protected information further comprising encryption of a file comprising at least part of the protected information the file is at least one of the following:
  temporary file and auto-recovery file.

In another preferred embodiment of the present invention, the protected information further comprises a file comprising at least part of the protected information, the file comprises any of temporary file and auto-recover file.

In another preferred embodiment of the present invention, the software client authenticates itself to a server before at least some of the sessions.

In another preferred embodiment of the present invention, the authentication depends on a classification level assigned to the protected information.

In another preferred embodiment of the present invention, the authentication comprises any of:
  password based authentication; and
  network address based authentication.

In another preferred embodiment of the present invention, the software client comprises components that can be automatically replaced.

In another preferred embodiment of the present invention, the secure server employs cryptographic encryption of at least one file containing the protected information.

In another preferred embodiment of the present invention, communication with the server is substantially transparent to the user.

In another preferred embodiment of the present invention, in accordance with the policy the protected information is encrypted utilizing the encryption capabilities of the software application.

In another preferred embodiment of the present invention, the software application operable to process the information is any of:
  a word processing application;
  Microsoft "word";
  Open office "word", and
  Star office "word".

In another preferred embodiment of the present invention, the software application comprises a control flag imparting a status of either read only or lock to a corresponding file, and file modification within the software application which is operable to process the information is disabled via the flag.

In another preferred embodiment of the present invention, the disabling of the file modification is controlled by the policy.

In another preferred embodiment of the present invention, the policy comprises adding forensic information to the protected information.

In another preferred embodiment of the present invention, the software client replaces the clipboard functionality of the software application thereby to process the protected information with a secure clipboard functionality.

In another preferred embodiment of the present invention, the protected information copied into the secure clipboard is stored in an internal data structure inaccessible to other applications.

In another preferred embodiment of the present invention, the software client is installed automatically from a remote server.

In another preferred embodiment of the present invention, the installation of the software client utilizes anti-virus installation infrastructure.

In another preferred embodiment of the present invention, updates of the software client utilize anti-virus update infrastructure.

In another preferred embodiment of the present invention, at least part of the software code of the software client resides in an encrypted form.

In another preferred embodiment of the present invention, at least part of the software code of the software client is attached to hardware of the computer workstation.

In another preferred embodiment of the present invention, the software client is operable to automatically add information to the protected information in accordance with the policy.

In another preferred embodiment of the present invention, the added information comprises any of:
  a document header;
  a document footer; and
  a textual disclaimer.

In another preferred embodiment of the present invention, the client software is operable to open file that comprises the protected information only while connected to at least one server.

In another preferred embodiment of the present invention, the servers enforce a policy with respect to the protected information.

In another preferred embodiment of the present invention, the policy implies a set of restrictions regarding the usage of the the protected information.

In another preferred embodiment of the present invention, the client software is operable to check that it is connected to a predetermined server before decrypting a file that comprise the protected information.

In another preferred embodiment of the present invention, the servers enforce a policy with respect to the protected information, and the policy comprises a set of restrictions regarding the usage of the the protected information.

In another preferred embodiment of the present invention, at least two servers are operable to define the policy.

In another preferred embodiment of the present invention, in the event of two or more conflicting policies being found, a strictest one of the policies is identified and used.

In another preferred embodiment of the present invention, in the event of two or more conflicting policies being found, a policy comprising the union of restrictions of the policies is used.

In another preferred embodiment of the present invention, connection to at least two servers are required in order to determine the policy.

In another preferred embodiment of the present invention, the server authenticates the integrity of the client by requiring a cryptographic hash of at least part of the client's software.

In another preferred embodiment of the present invention, the cryptographic hash is with respect to a random address in the client's software.

In another preferred embodiment of the present invention, the client is entangled with the server's software, such that a functioning stand-alone copy of the client's software does not exist.

In another preferred embodiment of the present invention, the method comprises at least two levels of protection, and the levels of protection are operable to be configured as a function of the secrecy of the protected information.

In another preferred embodiment of the present invention, in the most secure of the levels of protection, the protected information can only be accessed while connected to the server.

In another preferred embodiment of the present invention, in at least one of the levels of protection, the information can be accessed for a limited time after the connection with the server was terminated.

In another preferred embodiment of the present invention, in at least one of the levels of protection, the information can be accessed until the end of a current login session.

In another preferred embodiment of the present invention, in at least one of the levels of protection, the information can be unlimitedly accessed after the server approves the information.

In a second aspect of the present invention, a method for information protection is presented the information comprising information items, the information being for usage on a computer workstation, comprising:
  a) defining an information protection policy with respect to certain information item
  b) determining the measures required to protect the information according to the policy, and
  c) allowing the usage on a computer workstation of information comprising the items for which an information protection policy is defined, only while the required measures are being applied.

In another preferred embodiment of the present invention, the information protection measures comprises protecting information within a client software application.

In another preferred embodiment of the present invention, the protecting information within a client software application comprises disabling at least one of the controls of the application.

In another preferred embodiment of the present invention, the information protection measures comprises encryption of the memory of a graphic card or a video card.

In another preferred embodiment of the present invention, the information protection measures comprises forcing a video card or a graphic card to a mode that causes no meaningful information to be stored in the video card's memory.

In another preferred embodiment of the present invention, the information protection measures comprises scanning at least one storage device and identifying the existence of predefined information objects.

In another preferred embodiment of the present invention, the predefined information objects comprise confidential information objects.

In another preferred embodiment of the present invention, the information protection policy comprises at least one rule regarding at least one event of at least one software application operable to handle the information.

In a third aspect of the present invention, a method for information protection is presented, the information comprising information items, the information being for presentation on a computer screen, comprising:
  a) defining an information protection policy with respect to certain information item, b) determining the measures required to resist screen capture according to the policy, and
c) allowing presentation of information comprising items for which an information protection policy is defined on the computer screen only while the required measures are being applied.

In another preferred embodiment of the present invention, the measures comprise requiring typing a key-combination that forces the user to keep both hands on a keyboard.

In another preferred embodiment of the present invention, the measures comprise:
attaching and connecting a digital video camera to the computer, the digital camera photographing the user;
analyzing the output of the camera in order to determine that the user is looking at the computer screen; and
presenting the protected information on the computer screen only while the user is looking at the computer screen.

In another preferred embodiment of the present invention, the analysis of the output of the camera further allows to determine the part of the screen on which the eyes of the user are focused and the protected information appears only on the part of the screen on which the eyes of the user are focused.

In another preferred embodiment of the present invention, the analysis further allows to verify the identity of the user and the protected information is presented on the computer screen only after the identity of the user has been verified to be an identity of a user authorized to access the information.

In another preferred embodiment of the present invention, comprising storing the video sequence that is produced by the camera while the user is viewing the information.

In another preferred embodiment of the present invention, comprising storing the video sequence in a secure storage.

In another preferred embodiment of the present invention, comprising setting the frame-rate of the screen in a manner that is not synchronized with standard frame-rates of video cameras.

In another preferred embodiment of the present invention, comprising dynamically being the frame-rate of the screen.

In another preferred embodiment of the present invention, the measures comprise viewing the information being allowed only using a head-mounted display.

In another preferred embodiment of the present invention, the measures comprise a sensor operable to detect that the user is wearing the head-mounted display, and the protected information is presented on the screen only if the sensor has verified that the user is wearing the head-mounted display.

In another preferred embodiment of the present invention, the head-mounted display is equipped with a device operable to identify the user using a biometric feature.

In another preferred embodiment of the present invention, the protected information is presented on the bead-mounted display only after the sensor has verified that the user identity is an identity of an user authorized to use the information.

In another preferred embodiment of the present invention, the measures comprise requiring usage of special glasses for viewing the information on the computer screen.

In another preferred embodiment of the present invention, the special glasses are equipped with shutters, the shutters being opened only when the information is displayed.

In another preferred embodiment of the present invention, at least part of the information is presented on the screen in certain, very short, time intervals, while other visual information is presented on the screen during other time intervals, in a manner operable to interfere with viewing the information without the glasses or with photographing the screen.

In another preferred embodiment of the present invention, the information is presented on the screen in a manner that can substantially be viewed only while using glasses operable to present-dimensional image of the information presented on the screen.

In another preferred embodiment of the present invention, the measures comprise a sensor operable to detect that the user is wearing the glasses, and the protected information is presented on the screen only if the sensor has verified that the user is wearing the glasses.

In another preferred embodiment of the present invention, the glasses are equipped with a device operable to identify the user using a biometric feature.

In another preferred embodiment of the present invention, the protected information is presented on the screen only after the sensor has verified that the user identity is an identity of an user authorized to use the information.

In another preferred embodiment of the present invention, the measures comprise at least one camera-detection sensor, operable to detect the presence of camera.

In another preferred embodiment of the present invention, the protected information is presented on the screen only after the sensor has substantially verified that no camera capable of taking screenshots of the screen exists in a position that allows taking screenshots of the screen.

In another preferred embodiment of the present invention, the measures comprise verifying that the screen on which the information is to be displayed is a screen that restricts the viewing angle.

In another preferred embodiment of the present invention, the measures comprise constantly moving the protected information.

In another preferred embodiment of the present invention, the measures comprise displaying the text against a background that is designed in a manner that effectively reduces the quality of a picture taken by a standard camera.

In another preferred embodiment of the present invention, the measures comprise requiring the usage of a LCD screen.

In a third aspect of the present invention, a method for computer workstation based information protection is presented, the method comprising
detecting an event occurring at the workstation,
directing handling of the event, and
employing proactive information protection based on an assessment of an importance of the event to protection of information indicated as requiring protection technique.

In another preferred embodiment of the present invention, further comprising:
handling an event, the event being designated as directing information protection, and
employing a the proactive information protection technique in reaction to the event.

In another preferred embodiment of the present invention, the event comprise any of:
loading a local operating system;
loading an application;
user action;
presenting a specific information into the system;
an event generated by another system;
suspicious activity;
operating system time event; and
a network time event.

In a fourth aspect of the present invention, a system for computer workstation based information protection is presented, the system comprising:
a) monitor for monitoring user's actions on the computer workstation;

b) n analyzer for analyzing the actions in respect to a pre-defined policy to determine whether the actions prejudice information to which the policy applies, and
c) a policy execution module for executing the policy in accordance with the results of the analysis to prevent or modify or restrict or monitor or log the actions.

In another preferred embodiment of the present invention, the policy comprises restrictions on at least one of the following actions: print, save, copy, autosave, fax.

In another preferred embodiment of the present invention, the monitoring the user's actions on the workstation comprises detection of indications of attempts at tampering.

In another preferred embodiment of the present invention, the detection of indications of attempts of tampering comprises detection of at least one un-certified add-in.

In another preferred embodiment of the present invention, the detection of indications of attempts at tampering comprises detection of at least one debugging technique.

In another preferred embodiment of the present invention, the policy comprises restrictions of actions made available to the user upon the detection of indications of attempts of tampering.

In another preferred embodiment of the present invention, the restrictions of user's actions upon the detection of indications of attempts of tampering comprise applying restrictions on actions within a software application operable to process the information.

In another preferred embodiment of the present invention, the software data processing application operates in conjunction with a a tamper-resistant software client.

In another preferred embodiment of the present invention, the software client is operable to monitor the user's actions and to execute the policy.

In another preferred embodiment of the present invention, the software client is operable to detect information based on statistical identifiers residing in a specialized database.

In another preferred embodiment of the present invention, the software client is further operable to detect events of the software application.

In another preferred embodiment of the present invention, the policy further comprising managing usage rights.

In another preferred embodiment of the present invention, the usage rights comprise any of:
viewing at least part of the information;
modifying at least part of the information;
sending at least part of the information to a recipient;
storing at least part of the information;
storing at least part of the information by an application;
storing at least part of the information by a file system;
storing at least part of the information in a portable device;
storing at least part of the information in a removable media;
storing at least part of the information portable storage device that is connected to the workstation using a USB port;
pasting at least part of the information into a document;
printing at least part of the information;
printing at least part of the information to file;
printing at least part of the information to a fax, and printing a screen view document.

In another preferred embodiment of the present invention, the client software is operable to check that it is connected to a predetermined server before decrypting a file that comprise the protected information only while connected to at least one server.

In another preferred embodiment of the present invention, the servers enforce a policy with respect to the protected information, and the policy comprises a set of restrictions regarding the usage of the protected information.

In another preferred embodiment of the present invention, the software application operable to process the information is any of:
a word processing application;
Microsoft "word";
Open office "word", and
Star office "word".

In another preferred embodiment of the present invention, the software client replaces the clipboard functionality of the software application thereby to process the protected information with a secure clipboard functionality.

In another preferred embodiment of the present invention, the software client is installed or updated automatically from a remote server.

In another preferred embodiment of the present invention, the installation or updates of the software client utilize anti-virus installation infrastructure.

In another preferred embodiment of the present invention, the software client is operable to automatically add information to the protected information in accordance with the policy.

In a fifth aspect of the present invention, a system for information protection is presented, the information comprising information items, the information being for usage on a computer workstation, comprising:
a) a policy reference monitor for defining an information protection policy with respect to certain information item and determining the measures required to protect the information according to the policy, and
b) a policy execution module for allowing the usage on a computer workstation of information comprising the items for which an information protection policy is defined only while the required measures are being applied.

In a sixth aspect of the present invention, a system for information protection is presented, the information comprising information items, the information being for presented presentation on a computer screen, comprising:
a) a policy reference monitor for defining an information protection policy with respect to an certain information item and determining the measures required to resist screen capture according to the policy, and
b) a policy execution module for allowing presentation of information comprising items for which an information protection policy is defined on the computer screen only while the required measures are being applied.

In another preferred embodiment of the present invention, the measures comprise requiring typing a key-combination that forces the user to keep both hands on a keyboard.

In another preferred embodiment of the present invention, the measures comprise:
attaching and connecting a digital video camera to the computer, the digital camera photographing the user;
analyzing the output of the camera in order to determine that the user is looking at the computer screen; and
presenting the protected information on the computer screen only while the user is looking at the computer screen.

In another preferred embodiment of the present invention, the analysis further allows to verify the identity of the user and the protected information is presented on the computer screen only after the identity of the user has been verified to be an identity of a user authorized to access the information.

In another preferred embodiment of the present invention, comprising storing the video sequence that is produced by the camera while the user is viewing the information.

In another preferred embodiment of the present invention, comprising setting the frame-rate of the screen in a manner that is not synchronized with standard frame-rates of video cameras.

In another preferred embodiment of the present invention, comprising dynamically changing the frame-rate of the screen.

In another preferred embodiment of the present invention, the measures comprise viewing the information being allowed only using a bead-mounted display.

In another preferred embodiment of the present invention, the measures further comprise a sensor operable to detect that the user is wearing the head-mounted display, and the protected information is presented on the screen only if the sensor has verified that the user is wearing the head-mounted display.

In another preferred embodiment of the present invention, the head-mounted display is equipped with a device operable to identify the user using a biometric feature.

In another preferred embodiment of the present invention, the measures comprise requiring usage of special glasses for viewing the information on the computer screen.

In another preferred embodiment of the present invention, at least part of the information is presented on the screen in certain, very short, time intervals, while other visual information is presented on the screen during other time intervals, in a manner operable to interfere with viewing the information without the glasses or with photographing the screen.

In another preferred embodiment of the present invention, the measures comprise at least one camera-detection sensor, operable to detect the presence of camera.

In another preferred embodiment of the present invention, the protected information is presented on the screen only after the sensor has substantially verified that no camera capable of taking screenshots of the screen exists in a position that allows taking screenshots of the screen.

In another preferred embodiment of the present invention, the measures comprise constantly moving the protected information.

In another preferred embodiment of the present invention, the measurers comprise displaying the text against a background that is designed in a manner that effectively reduces the quality of a picture taken by a standard camera.

In a preferred embodiment of the present invention, the defined policy also includes adding forensic information to documents. This can be achieved by altering parts of the information in the document in a manner that is preferably substantially imperceptible, as described in PCT application number IL02/00464, filed Jun. 16, 2002.

It is the object of this invention to provide a method and a system for information protection, based primarily but not exclusively on a software client, that resist attempts for unauthorized usage of protected information.

The present invention successfully addresses the shortcomings of the presently known configurations by providing a method and system for robust protection of information and knowledge, which can efficiently serve current needs.

BRIEF DESCRIPTION OF THE DRAWINGS

For a better understanding of the invention and to show how the same may be carried into effect, reference will now be made, purely by way of example, to the accompanying drawings, in which.

DETAILED DESCRIPTION OF PREFERRED EMBODIMENTS

Figure 1:
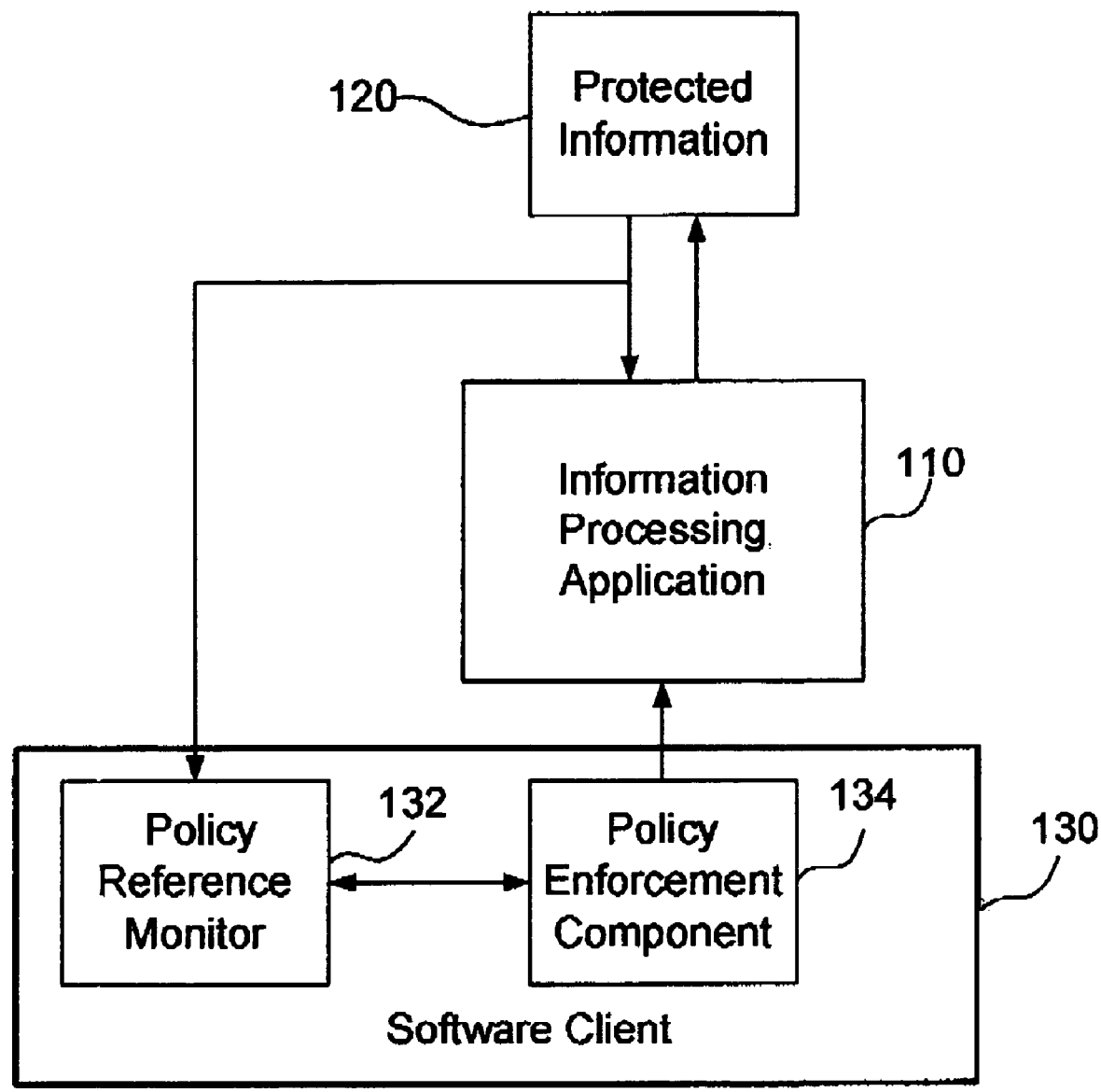
FIG. 1 illustrates a system for protecting confidential information that utilizes client-side software, constructed and operative according to a preferred embodiment of the present invention.

The present invention describes a method and system for protecting confidential information. In particular, the present invention describes a method and a system that allows monitoring and control of the usage of information at the user's computer workstation. The system is operable to enforce a predefined policy with respect to the protected information.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

According to a first aspect of the present invention, a method for computer workstation based information protection is presented. The method is based on the following basic steps:
a) Monitoring on a computer workstation
b) Analysis of the user's actions in respect to a pre-defined policy
c) Executing the policy in accordance to the results of the analysis.

In a preferred embodiment of the present invention, the information protection comprises protecting information within a software application operable to process the information. In a preferred embodiment of the present invention, the software application operable to process the information is a word-processing application, (such as Microsoft "word" or Open office "word"), or a spreadsheet application (such as Microsoft™ "Excel"). In a preferred embodiment of the present invention, the software application is operating in conjunction with a software client, which is, preferably, a tamper-resistant software client. The software client is operable to monitor the user's actions and to execute a predefined policy. In a preferred embodiment of the present invention, the policy comprises restrictions on at least one of the following actions: print, save, copy, autosave, and fax.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Reference is now made to FIG. 1, which illustrates a system for protecting confidential information that utilizes client-side software, constructed and operative according to a preferred embodiment of the present invention: the information processing application 110 (e.g., a word-processor) attempt to access the protected information 120. The policy reference monitor 132, which resides on the software-client 130 identifies the protected information 120 and/or the policy assigned to it, and instruct the policy enforcement component 134 to enforce required restriction on the usage of the protected information 120 by the content processing application 110.

In a preferred embodiment of the present invention, four interfaces between the software client and the content-processing application are used in conjunction with each other for implementing the method:
 Add in: This interface involves creating a component-object-model (COM) to be loaded into the application. The object uses the callbacks and other interfaces that the information processing application provides to it.
 Automation: Similar to the add-in interface, this interface preferably utilizes the component-object-model (COM) automation interface provided by the information processing application.
 Operating-system interface: A relatively low level interface that involves interfacing the MS-windows operating-system environment. The interface is preferably mainly to the clipboard, and is operable to detect events such as focus changes (to callback function) and support the anti-debugging techniques described below.
 Macro: Some functionality is provided by attaching macros to the information-processing application documents: e.g., in a preferred embodiment of the present invention the documents are encrypted and a macro is required in order to open them.

In a preferred embodiment of the present invention the client-side software includes components operable to control screen capture, control clipboard, and control output (print/save/auto-save/fax) functionality. In addition, the client-side software includes a component operable to control or prevent debugging or circumvention techniques from thwarting the control.

In another preferred embodiment of the present invention, the system detects tampering attempts and attempts to disable it (e.g. by handling an add-in unload event). After detecting such attempt, the system is operable to prevent the attempt by disable the protected information and/or delete the protected information and/or encrypt the protected information.

In a preferred embodiment of the present invention the policy that is executed by the software client comprises restrictions of the user's actions upon detection of indications of attempts of tampering. In a preferred embodiment of the present invention, the restrictions of user's actions upon detection of indications of attempts of tampering comprises restrictions on actions within the software application operable to process the protected information. In a preferred embodiment of the present invention, upon the detection of indications of attempts of tampering the system performs actions such as buffer encryption, shared memory encryption and preventing the decryption of the protected information.

Detection of tampering attempts can be based on either logical indications or statistical indications. Logical indications may comprise detection of one or more un-certified add-in, especially add-ins that are hooked to windows events, unauthorized existence of debugging tools, virtual machines, software emulators, software "traps" and interrupting. Statistical indications may comprise quantitative indications regarding unusual or suspected activities, that are performed by a certain user or on certain workstation within a certain timeframe or abnormal volume or distribution of certain activities, such as inputs to a configuration field, clicking on certain controls, etc.

In a preferred embodiment of the present invention, the system reports about tampering events and/or user's actions that does not comply with the organizational policies and procedures (or are suspected not to comply with the organizational policies) to the system administrator and/or other authorized entity.

In a preferred embodiment of the present invention, the system logs tampering events and/or user's actions that do not comply with the organizational policies and procedures (or are suspected not to comply with the organizational policies).

In a preferred embodiment of the present invention, the software client is operable to detect protected information based on statistical identifiers residing in a specialized database that preferably resides on a secure server.

In another preferred embodiment of the present invention, the protected information is always encrypted and it is not possible to access it without a specialized client-side component (e.g. it only resides unencrypted in the components internal data). In another preferred embodiment of the present invention, the protected information is stored in a secured location, (e.g., a secure file server) and only the client-side component may access it, preferably after appropriate authentication, e.g., by using the IP and/or MAC address or a private key.

Figure 2:
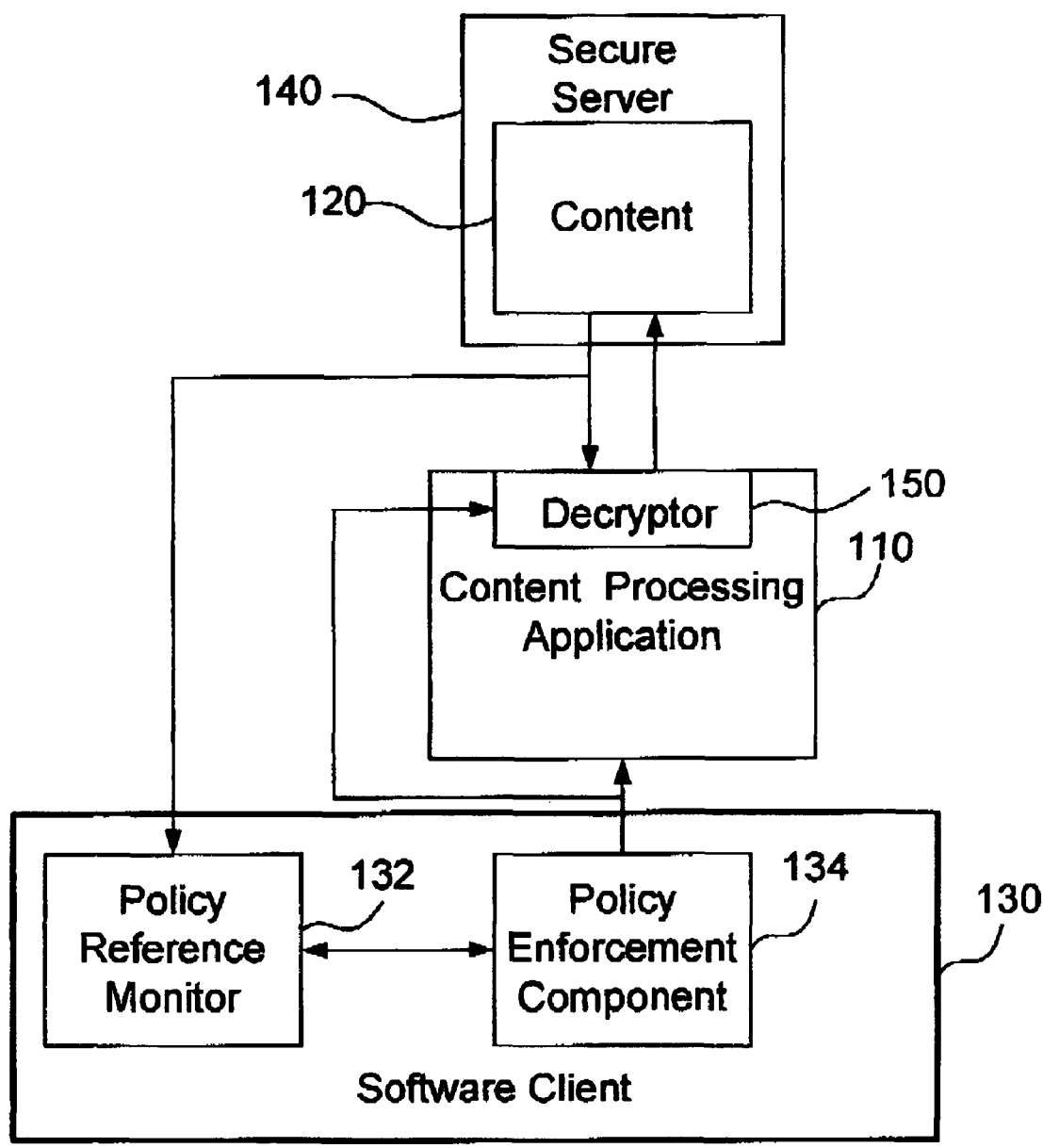
FIG. 2 illustrates a system for protecting confidential information, substantially similar to the one illustrated in FIG. 1, where the content is resides encrypted on a secure server, according to a preferred embodiment of the present invention.

Reference is now made to FIG. 2, which illustrates a system for protecting confidential information, substantially similar to the one illustrated in FIG. 1, where the content is resides encrypted on a secure server, according to a preferred embodiment of the present invention: In this system the protected information 120 resides, preferably encrypted, on a secure server 140, and the policy enforcement component 134 instruct the decryptor 150 to decrypt the protected information 120 only if the policy reference monitor 132 indicate that the specific content processing application 110 is authorized to access the content.

In another preferred embodiment of the present invention, the client is bound to a specific hardware, utilizing e.g., the CPU ID number. In another preferred embodiment of the present invention, the client is bound to a specific hardware, utilizing e.g., the CPU ID number, the hard-disks ID, and hardware configuration, MAC addresses, network ID, allows for only local changes in the registry file and file system (both logical, and physical), OS serial number, local changes in the applications installation, registration information of the computer, a logic to allow for gradual changes can preferably be used, preventing 'zigzagging' changes (changes that are reversed, especially when the same change is reversed more than once, or a reversed change is repeated) indicative of several computers utilizing the same identification, the level of tolerance to minor changes can be policy dependent.

Figure 3:
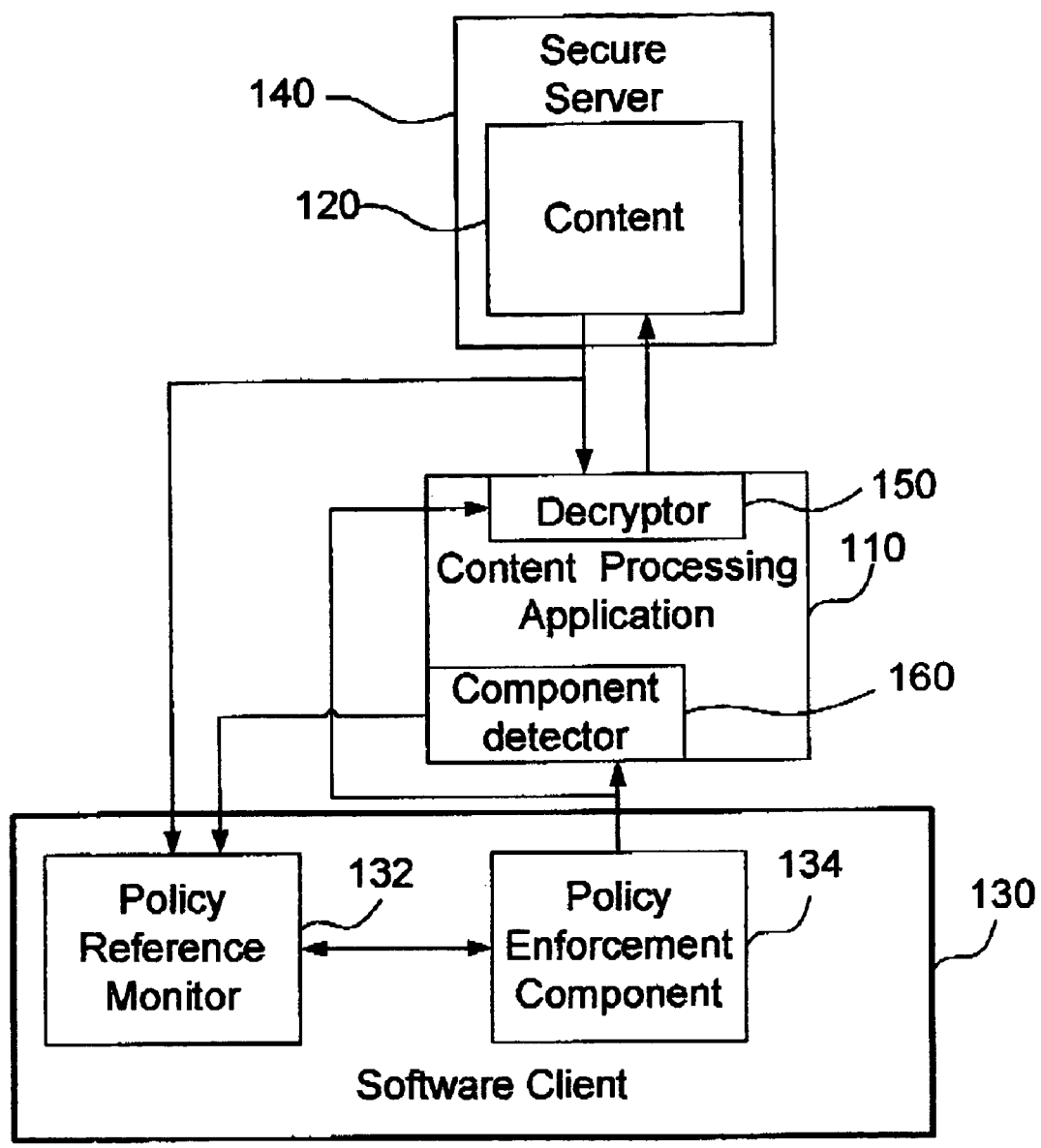
FIG. 3 illustrates a system, substantially similar to the system of FIG. 2, where a software component detector is presented, operable to detect add-ins, debuggers, simulation environment, virtual machines remote administration tools etc. and to reports its findings to the reference monitor.

In another preferred embodiment of the present invention, the security-level of the software client is further enhanced by providing a component operable for detection of add-in and anti-debugging. This component detects other software (especially add-ins and software hooked to windows events) and debuggers, including simulation environment, virtual machines and remote administration tools, thereby mitigate attempts to circumvent the basic functionality. In cases in which suspected add-ins and/or debuggers are detected, the system preferably does not decrypt encrypted document. FIG. 3 illustrates a system, substantially similar to the system of FIG. 2, where a software component detector 160 is presented. The the component detects add-ins, debuggers, simulation environment, virtual machines, remote administration tools etc. and reports its findings to the policy reference monitor 132. In cases in which suspected add-ins and/or debuggers are detected, the system preferably does not decrypt encrypted document.

Figure 4:
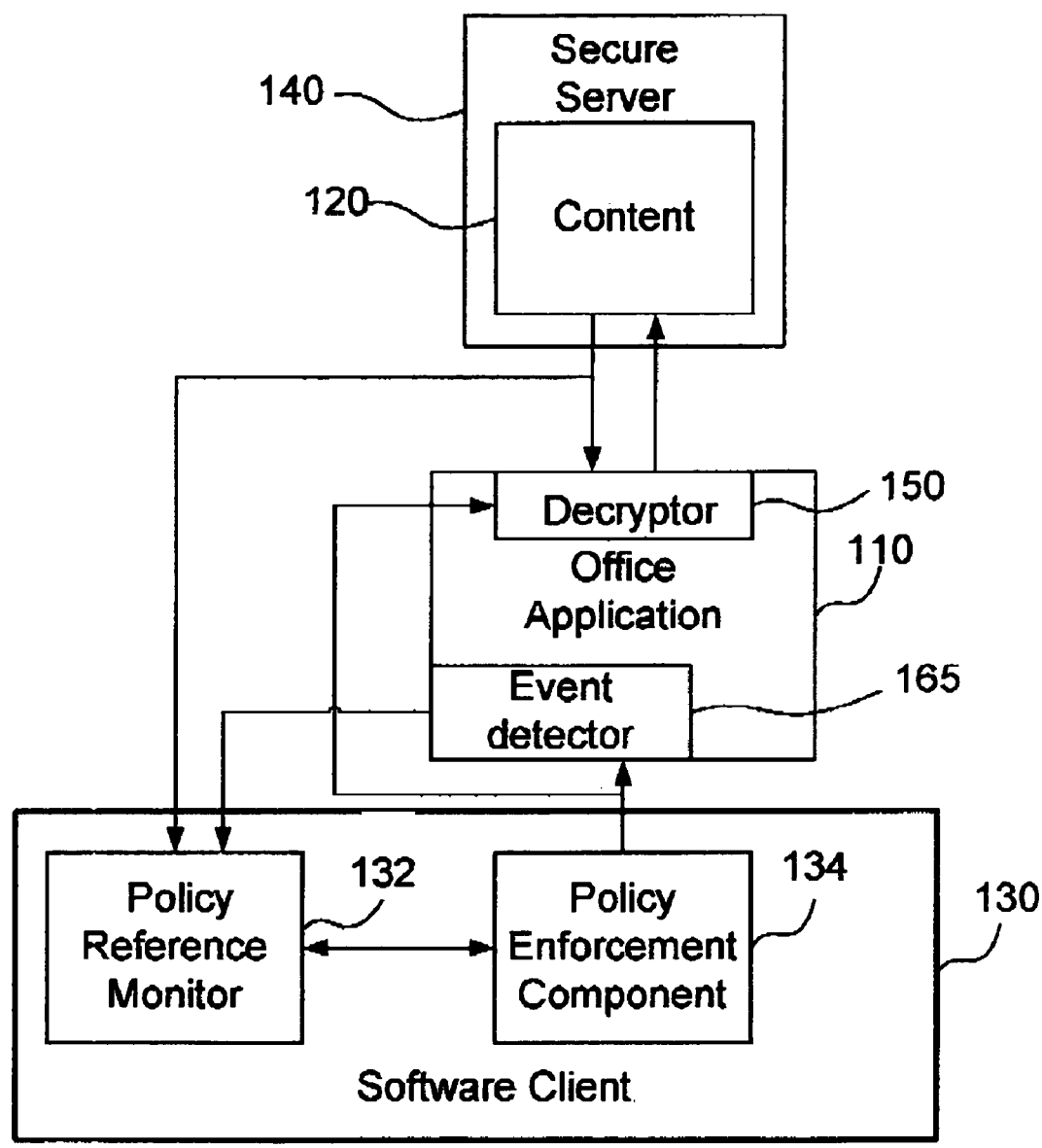
FIG. 4 illustrates a system, substantially similar to the system of FIG. 2, where the software client of the system is entangled with a standard office software package, such as MS-Office™ or Star Office, according to preferred embodiment of the present invention.

FIG. 4 illustrates a system, substantially similar to the system of FIG. 2, where the software client of the system is entangled with a standard office software package, such as MS-Office™ or Star Office, according to preferred embodiment of the present invention. The system utilizes the event detector 165 in order to detect the events of the office software package, such as opening a document, saving a document, cut and paste and selection. Information regarding such events is reported by the event detector 165 to the policy reference monitor 132, which instructs the policy enforcement component 134 whether to allow the event to happen, thereby controlling operations within the office environment software.

In a preferred embodiment of the present invention, the Policy reference monitor 132 comprise[?] a policy with respect to usage rights, such as:
  viewing at least part of the information;
  modifying at least part of the information;
  sending at least part of the information to a recipient;
  storing at least part of the information;
  storing at least part of the information by an application;
  storing at least part of the information by a file system;
  storing at least part of the information in a portable device;
  storing at least part of the information in a removable media;
  storing at least part of the information portable storage device that is connected to said workstation using a USB port;
  pasting at least part of the information into a document;
  printing at least part of the information;
  printing at least part of the information to file;
  printing at least part of the information to a fax, and
  printing a screen The usage rights may be determined according to attributes of the protected information and the user, such as: the classification of the protected information, the classification level of the user and the authentication level of the user. The actions that are preformed by the Policy Enforcement Component 134 comprise actions such as: "enable usage", "disable usage", restricting the usage, according to pre-determined set of restrictions, reporting about the usage and monitoring the usage.

In a preferred embodiment of the present invention, the policy defined by the policy reference monitor 132 comprise a policy with respect to portable media that is connected to the workstation using the universal serial bus (USB) port (e.g., not allowing protected information to be stored on portable storage device that is connected to the workstation using the USB port). In a preferred embodiment of the present invention, the client is operable to detect devices connected via USB port, and in particular, portable storage device that is connected to the workstation using the USB port.

In another preferred embodiment of the present invention, the security-level of the system is further enhanced by disabling office controls (such as "save as") and adding new (or replacement) controls, which enables control of operations within the office environment. In a preferred embodiment of the present inventions, the changes in controls are dictated by a pre-defined policy.

In another preferred embodiment of the present invention, the security-level of the system is further enhanced by handling the event of focus change (e.g., by tacking the location of the cursor) thereby providing an ability to remove content from the clipboard (possibly temporarily) in order to prevent other applications from accessing the protected document.

In another preferred embodiment of the present invention, the security-level of the system is further enhanced by encrypting the actual files, and possibly also the clipboard information and other memory or disk representations of the document (including temporary and recovery files), thereby effectively preventing circumvention. In another preferred embodiment of the present invention, the memory or the video and/or graphic card is similarly protected by using encryption and/or scrambling, and/or by forcing the video mode to a mode that causes no meaningful information to be stored in the video/graphic card's memory.

Figure 5:
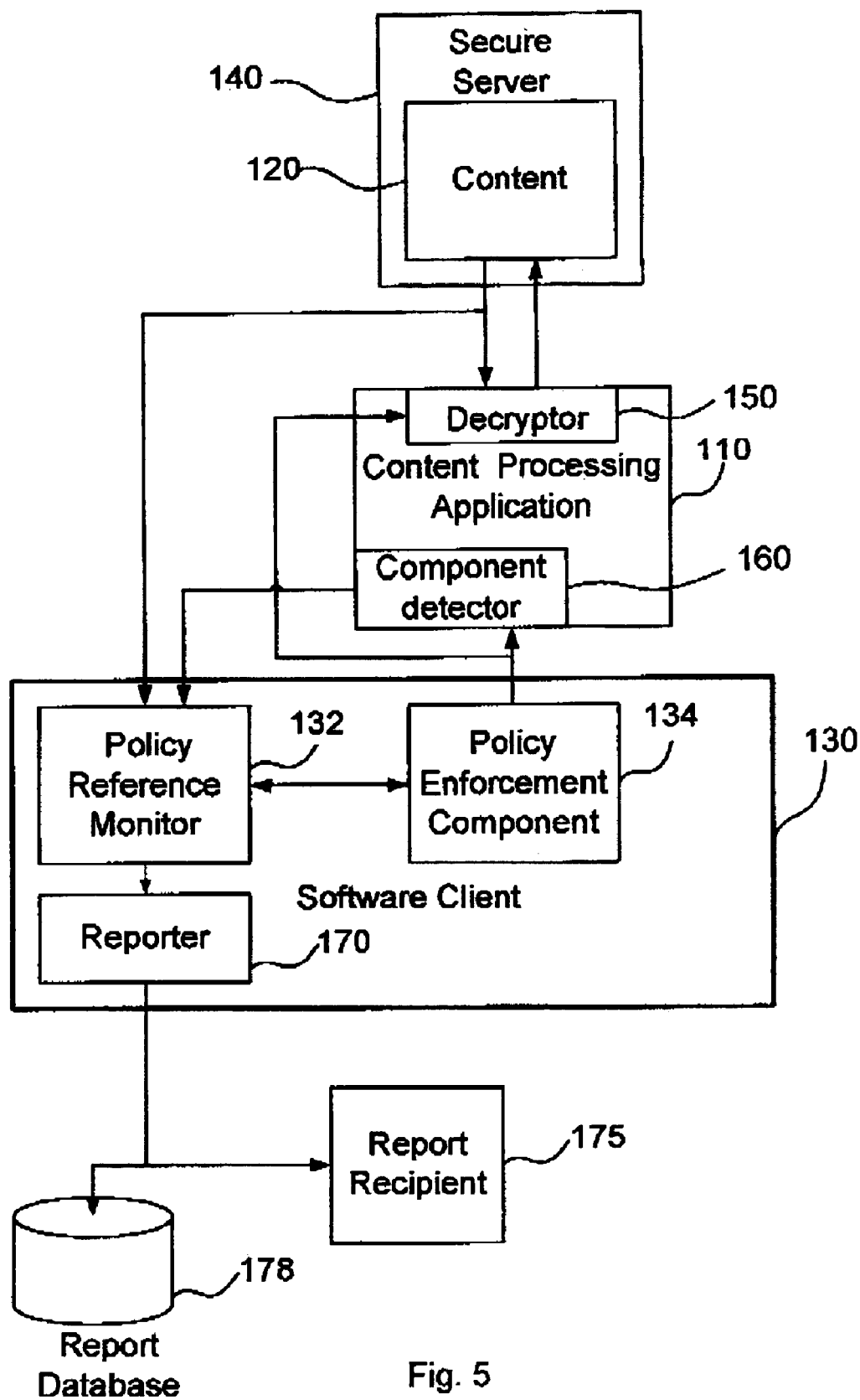
FIG. 5 illustrates a system, substantially similar to the system of FIG. 3, where a report component is presented. The the component reports about actions that do not comply with the organizational policy and about suspected actions.

In a preferred embodiment of the present invention, the client-side software reports another entity about attempts to perform actions that do not comply with the organizational policy and about suspected actions, such as installing debuggers, remote administration tools, simulation environment, virtual machines, etc. FIG. 5 illustrates a system, substantially similar to the system of FIG. 3, where a report component 170 is presented. The the component reports the report-recipient 175 (which may be a person, e.g., the organization security manager) about actions that do not comply with the organizational policy and about suspected actions according to instructions from the policy reference monitor 132. In a preferred embodiment of the present invention, the policy reference monitor 132 instructs the reporter 170 to store the reports in a database 178.

In a preferred embodiment of the present invention, the client-side software performs extensive logging of attempts to perform actions that do not comply with the organizational policy and about suspected actions.

Figure 6:
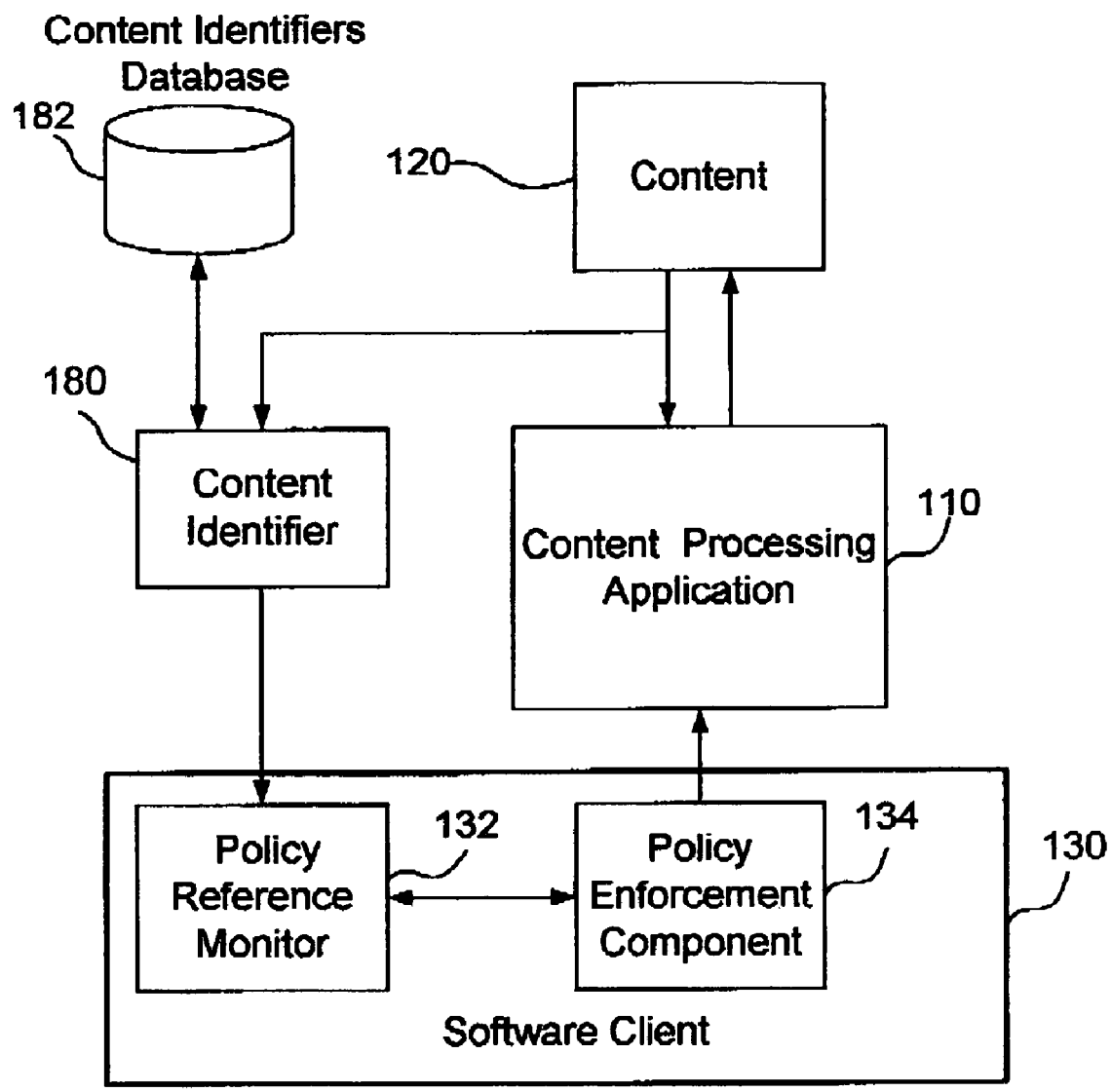
FIG. 6 illustrates a system, substantially similar to the system of FIG. 1, where a content identifier is used in order to identify the content, possibly using the information stored in a content identifier database.

In a preferred embodiment of the present invention, the client is operable to detect confidential information, based on statistical identifiers resides in a specialized database. In a preferred embodiment of the present invention, the the specialized database resides on a secure server. FIG. 6 illustrates a system, substantially similar to the system of FIG. 1, where a content identifier 180 is used in order to identify the content, possibly using the information stored in the content identifier database 182. The results of the identification process are transferred to the policy reference monitor 132, possibly with an accompanying "confidence level" that represents the amount of uncertainty in the identification. The policy reference monitor 132 determines the policy that need to be applied with respect to the identified content and instructs the policy enforcement component 134 accordingly. Method for identification of information items are described in PCT application "A method and system for managing confidential information" identified as PCT/IL03/00889 and in provisional patent application No. 60/422,128 "A method and system for managing confidential information", the content of which are hereby incorporated herein by reference in their entirety.

Figure 7:
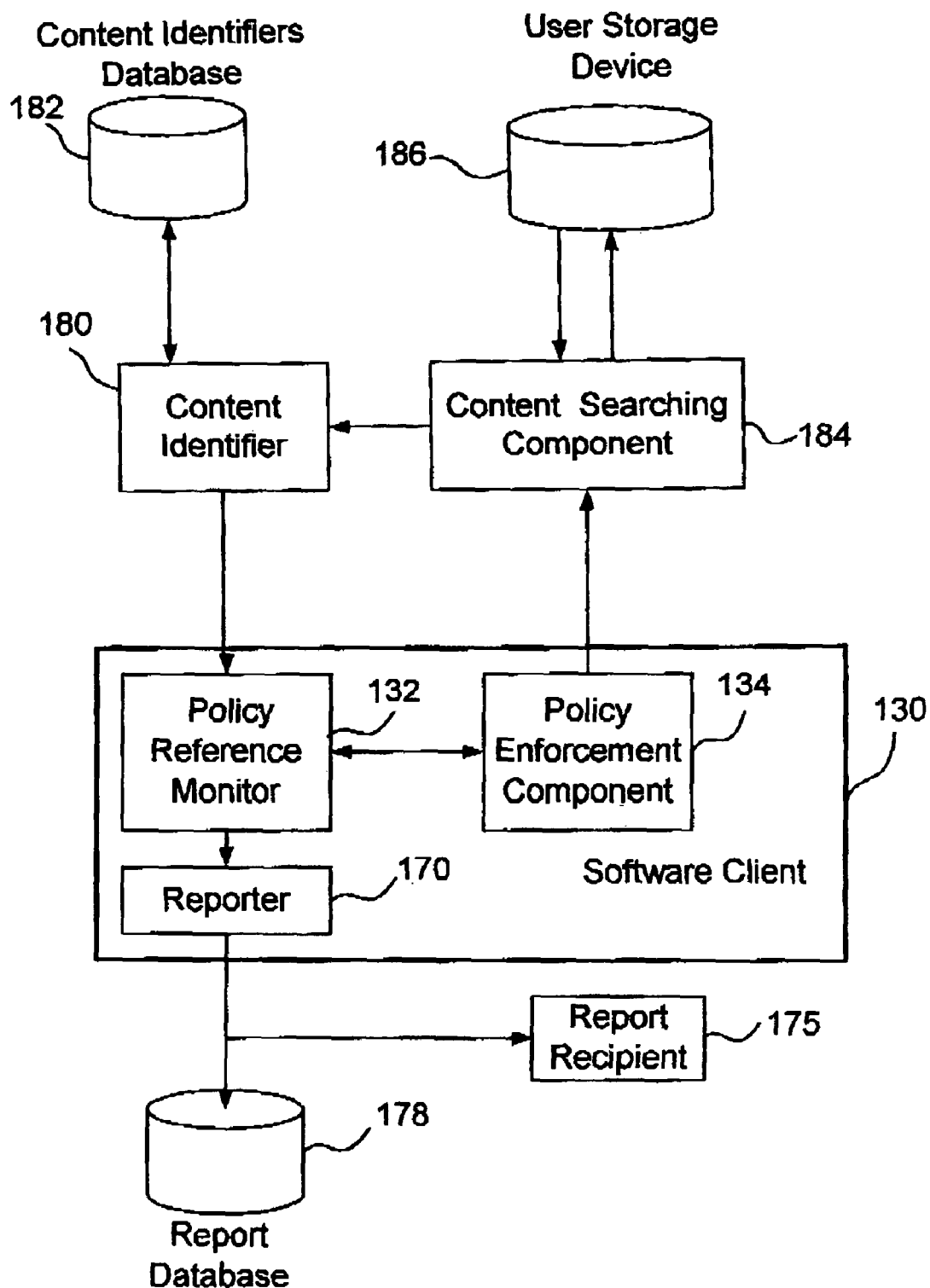
FIG. 7 illustrate another aspect of the present invention, in which the system scans for predesignated information objects in storage devices, such as the user's hard disks, in order to locate unauthorized content stored by a user, utilizing the client side software.

Reference is now made to FIG. 7, which illustrate another aspect of the present invention, in which the system scans for pre-designated information objects in storage devices, such as the user's hard disks, in order to locate unauthorized content stored by a user, utilizing the client side software: according to instructions from the policy reference monitor 132, the policy enforcement component 134 instructs the content-searching component 184 to search the user storage device 186 in order to locate unauthorized digital content. The content in the storage device is identified by the content identifier 180, possibly using the content identifiers database 182. Results are transferred to the policy reference monitor 132, who may send the results to the reporter 170, which send a report to the recipient 175 and/or log the report in the report database 178. The policy reference monitor 132 may also instruct the policy enforcement component 134 to apply a certain policy—e.g., to delete the unauthorized content.

In a preferred embodiment of the present invention, the system manages usage rights in accordance to:
  The predetermined policy.
  The classification of the document.
  The classification of the user.
  The authentication level of the user.

In a preferred embodiment of the present invention, to each usage the policy comprise one or more of the follows:
  Enable/disable usage.
  Restricting the usage, according to pre-determined set of restrictions.
  Reporting about the usage
  Monitoring the usage.

In a preferred embodiment of the present invention, usage rights comprises one or more of the follows:
  View document: the system either enable viewing the entire document, disable viewing the entire document or enable viewing selected parts only.
  Modify the document: the system either enables all modifications, disable any modification or enable only restricted modifications.
  Send to: the system either enables sending to any recipient, disables sending to any recipient, or enable sending only to selected recipients.
  Storing, either by the application or the file system: the system either enables storing, disable storing or enable storing under certain restriction over the format and/or the storage device, location, directories etc.
  Store in a portable device or removable media: the system either enables storing, disable storing or enable storing under certain restriction over the format, directories, etc.
  Paste to other document: the system either enables pasting, disable pasting or enable pasting only to documents with the same or higher classification.
  Print (including print to file and to fax): the system either enables printing, disable printing or enable printing using restricted printers only.
  Print-screen: the system either enables or disables print-screen operation.

In a preferred embodiment of the present invention, the software client is based on a tamper resistant software component.

In a preferred embodiment of the present invention, in cases where the usage is restricted, the content of the document is strongly encrypted. The encryption can be opened by the client application.

In a preferred embodiment of the present invention, in cases where the usage is restricted, the information, or at list a salient parts of it, is preferably reside on a secure server.

In a preferred embodiment of the present invention, the transport between the server and the client is encrypted, preferably using standard transport encryption (SSL/TLS).

In a preferred embodiment of the present invention, auto-recover and temporary files rendered from the protected information are encrypted and/or located on the server.

In a preferred embodiment of the present invention, the client authenticates itself to the server before any session. In a preferred embodiment of the present invention, the level of authentication is depended on the classification of the document.

In a preferred embodiment of the present invention, the authentication is based on, at list, the user address (MAC/IP) and the user password.

In a preferred embodiment of the present invention, the client includes renewable components that allow a fast replacement in cases of breaches.

In a preferred embodiment of the present invention, the files on the server are encrypted utilizing CFS (cryptographic file-system) or an equivalent.

In a preferred embodiment of the present invention, the access to the server is secured using, at least, standard security measures, such as these provided by modern operating systems.

In a preferred embodiment of the present invention, the server performance assures transparent operation in a client-server mode, in order not impair user's experience. In case, special care should be taken in order to assure high responsiveness, fist response, low latencies etc, this can be done be assigning a high priority to interactive processes, doing work in the background, providing a response before the full work is done as soon as there is enough data to produce the response, optimizations, etc.

In a preferred embodiment of the present invention, the encryption is based on the information-processing application built-in encryption (e.g. "MS-office" application encryption)

In a preferred embodiment of the present invention, according to a pre-defined policy, file modification within the software application operable to process the information is disabled using a flag of the application, wherein the flag provides functionality of "read-only" or "lock". In another preferred embodiment of the present invention, the system controls the change of this flag.

In a preferred embodiment of the present invention, the defined policy also includes adding forensic information to documents. This can be achieved by altering parts of the information object in a manner that is preferably substantially imperceptible, as described in PCT application number IL02/00464, filed Jun. 16, 2002.

In another preferred embodiment of the present invention, the method includes avoiding the security risks posed by the shared clipboard resource, by transparently avoiding the use of the clipboard (i.e. blocking access to it from inside the application), and storing the information copied into the clipboard in an internal data structure (i.e. an internal, private clipboard) inaccessible to other applications.

In a preferred embodiment of the present invention, the system utilizes methods that facilitate automatic installation and up-dates of clients, utilizing e.g., anti-virus installation or up-date infrastructure.

In a preferred embodiment of the present invention, at least part of the software code of the client resides in an encrypted form.

In a preferred embodiment of the present invention, the code is attached to the computer, e.g., by identifying the ID number of the CPU and use this number as a part of a cryptographic license.

In a preferred embodiment of the present invention, the system is operable to automatically add headers, footers disclaimers etc. to each document, in accordance with a pre-defined policy.

In a preferred embodiment of the present invention, the client-side software is operable to open the document only while connected to one or more. While connected, the server enforces a certain policy with respect to the document. The policy implies a set of restrictions regarding the usage of the document. In a preferred embodiment of the present invention, more then one server is operable to define the policy. In cases where there is a conflict between the policies, the strictest policy applies. In another preferred embodiment of the present invention, connection to more then one server is required in order to define a policy. This can be achieved, e.g., by splitting the required information between the servers.

Figure 8:
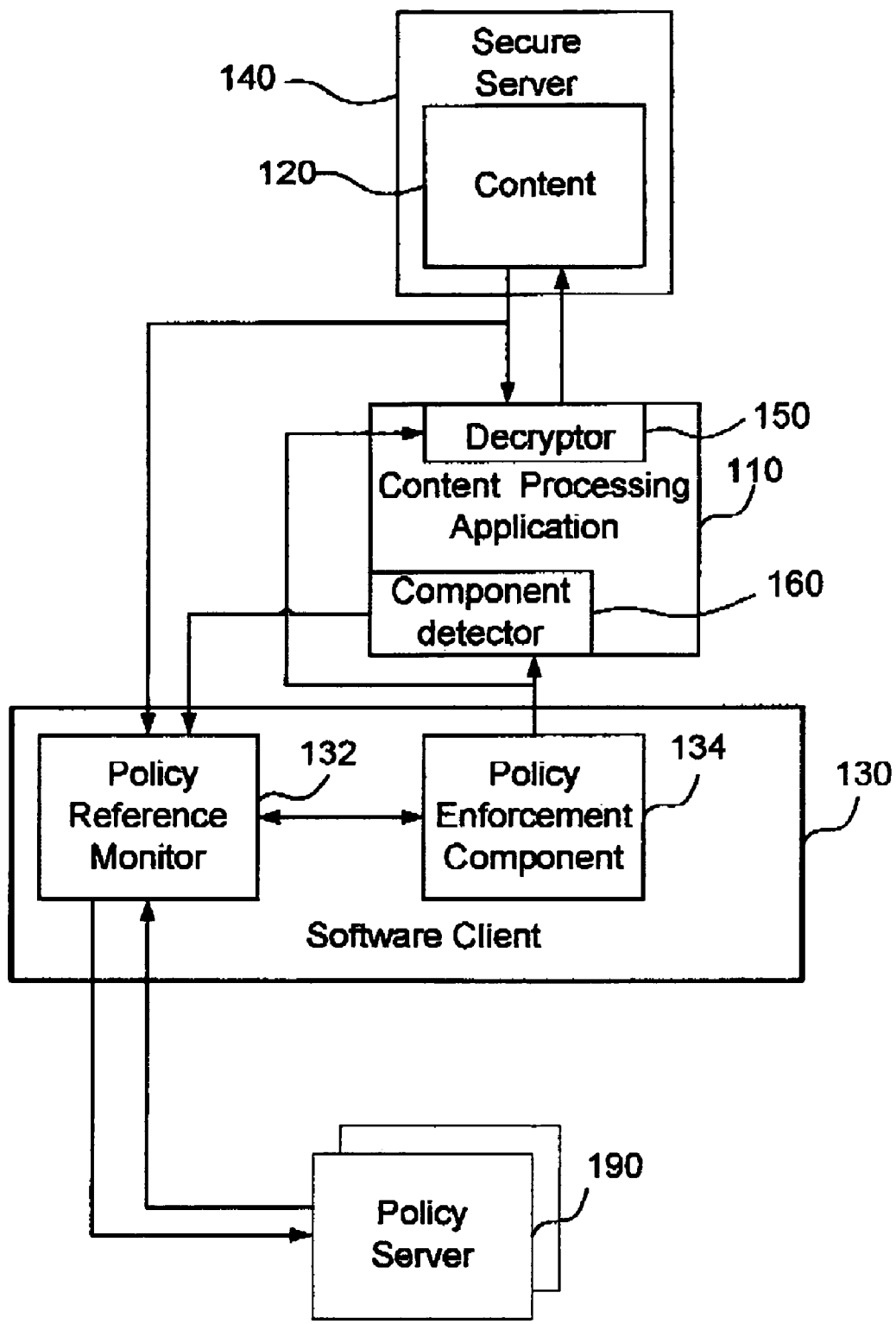
FIG. 8 illustrates a system, similar to the one illustrated in FIG. 3, where the policy reference monitor inform a remote policy server about the details of the content and the user the policy server and obtain instructions from the the policy server.

FIG. 8 illustrates a system, similar to the one illustrated in FIG. 3, where the policy reference monitor 132 inform the policy server 190 about the details of the content and the user. The policy server (or policy servers) sends instructions to the policy reference monitor 132 regarding the required user restriction, reporting and other policy elements, and the policy reference monitor 132 instructs the policy enforcement component 134 to enforce the the restriction. In a preferred embodiment of the present invention, the policy server 190 also provides the cryptographic key that allows the decryption of the digital protected information 120 by the decryptor 150.

In a preferred embodiment of the present invention, the server authenticates the client integrity by requiring a cryptographic hash-function of parts of the client software. In a preferred embodiment of the present invention, the required hash function is computed with respect to random segments in the client software, where the random segments are preferably changed every session.

In a preferred embodiment of the preset invention, hashes of selected segments of the client-software, including segments of the decryptor 150, are used as parts of the encryption/decryption key In a preferred embodiment of the present invention, the system provides an alert in cases in which there is a suspicion of tampering, thereby provides an effective deterrence against software tapering.

In a preferred embodiment of the present invention, the software client is entangled with the server software, such that a functioning stand-alone copy of the client software does not exists on the user hard disk.

In a preferred embodiment of the present invention, the system provides several levels of protection, which can be configured as a function of the secrecy of the protected information. In the highest protection level, the information can be accessed only while connected to the server. In a less secured protection level, the information can be accessed for a limited time after the connection with the server was terminated. In a less secured protection level, the information can be accessed until the end of the login session, and in a less secured protection level, the information can be unlimitedly accessed after the server once approved it.

Figure 9:
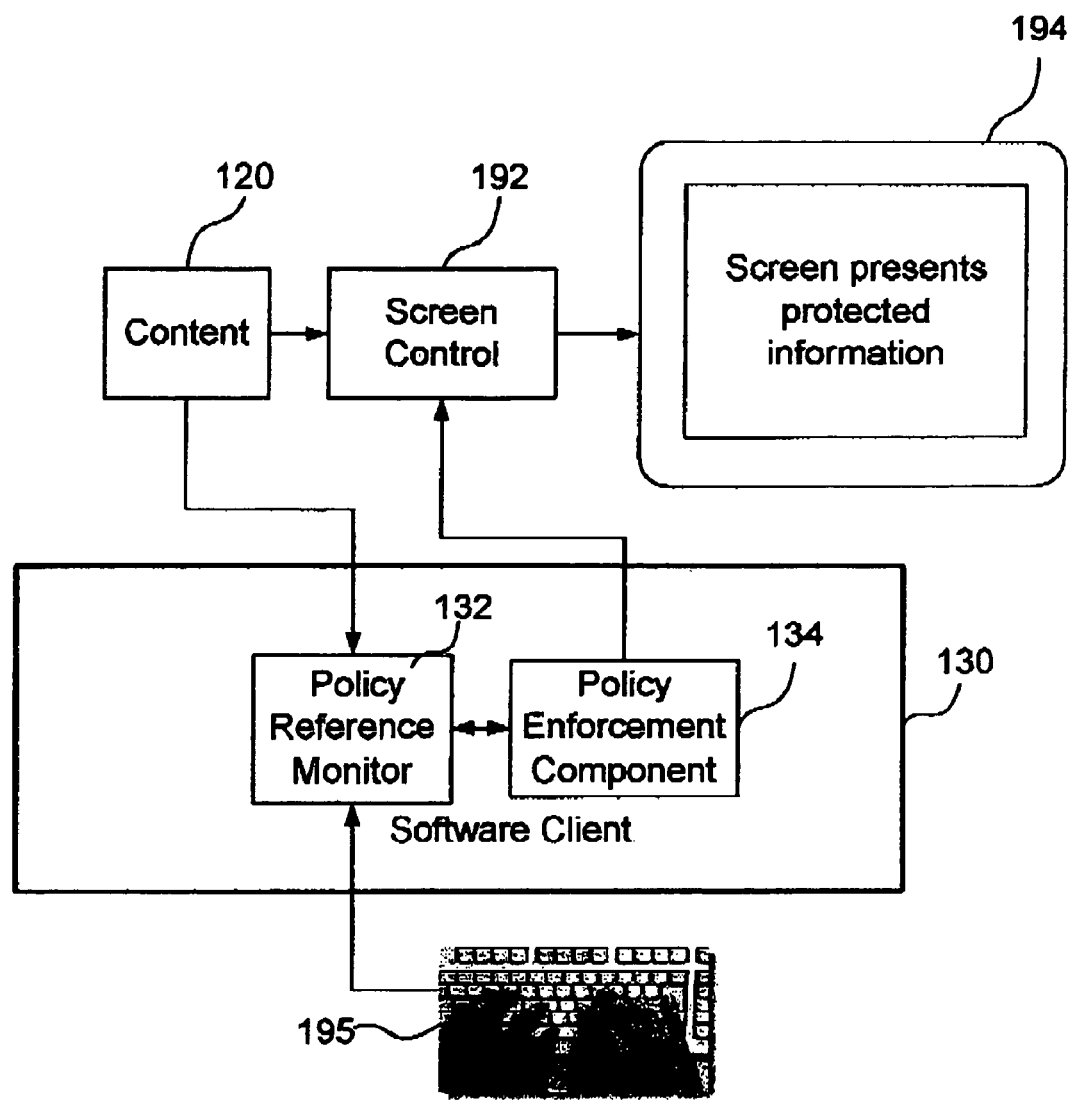
FIG. 9 illustrates a method according to which the screen control allow the content to appear on the screen only if the policy reference monitor assures that a required key combination is pressed on the keyboard.

In another aspect of the present invention, the system utilizes methods that mitigate the risks of data leakage by taking pictures of the screens. The proliferation of digital cameras in recent years, and the anticipated proliferation of cameras attached to cellular phone allow users to circumvent many protection devices, by taking pictures of the screen and transfer the pictures in an unauthorized manner. In a preferred embodiment of the present invention, the system is operable to mitigate unauthorized screen-capture by a camera, in cases in which protected information is processed on the user's workstation, utilizing one or more of the following method:

Requiring typing key combination that force the user to keep both hands on the keyboard (e.g., 'alt'+'ctrl'+'page-down'+'end') in order to view the protected information: the protected information appears on the screen only when both hand of the user are busy pressing the keyboard, which make it hard for the user to take screenshots. Reference is now made to FIG. 9, which illustrate this method: the screen control 192 allows the protected information 120 to appear on the screen 194 only if the policy reference monitor 132 assures that the required key combination is pressed on the keyboard 193. In this case, the policy reference monitor 132 instructs the policy enforcement component 134 to instruct the screen control 192 to allow viewing the protected information 120 on the screen 194.

Figure 10:
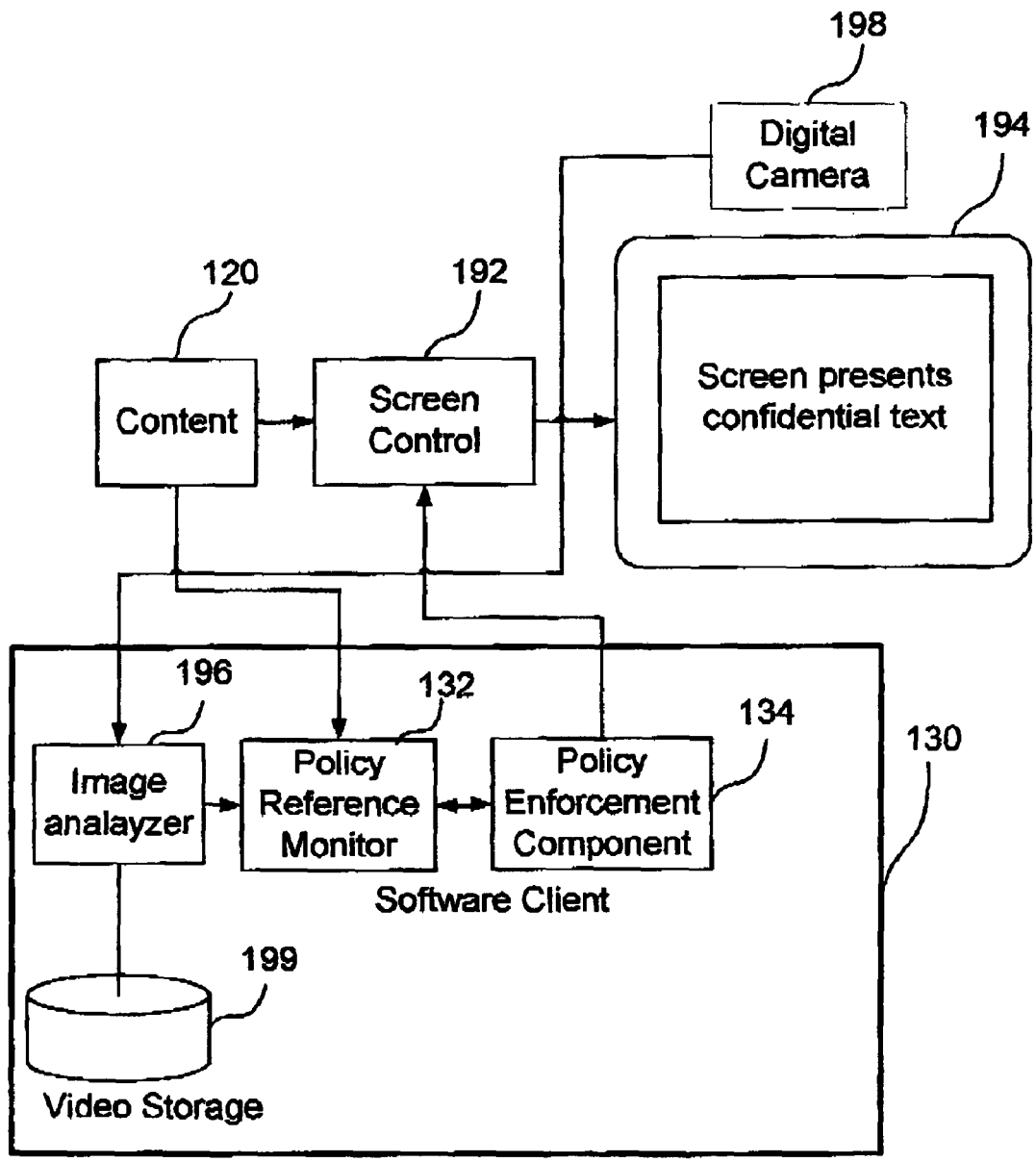
FIG. 10 illustrates a system, constructed and operative according to a preferred embodiment of the present invention, in which a digital camera is attached to the user computer and an image analyzer analyzes the video signal obtained by the digital camera in order to assure that the user is looking at the screen and/or that no other camera is presented.

Attaching and connecting a digital video camera to the user computer: the digital camera photographs the user and allows viewing the document only while the user is looking at the screen. Reference is now made to FIG. 10, which illustrates this method: the image analyzer 196 analyzes the video signal obtained by the digital camera 198, in order to assure that the user is looking at the screen and/or that no other camera is presented and/or to verify the identity of the user. The screen control 192 allow the protected information 120 to appear on the screen 194 only if the policy reference monitor 132 assures that the user is looking at the screen and/or that no other camera is presented. In this case, the policy reference monitor 132 instructs the policy enforcement component 134 to instruct the screen control 192 to allow viewing the protected information 120 on the screen 194. In another preferred embodiment of the present invention, the video sequence that is produced while the user is viewing the document is stored in a secure storage 199, thereby providing an effective deterrence against producing of screenshots of the document with a camera. In a preferred embodiment of the present invention, text appears only on the part of the screen in which the eyes of the user are focused. This can be done utilizing the known methods for providing a mouse-substitute by tracking eye-movements, e.g., using the method described in U.S. Pat. No. 5,731,805 or U.S. Pat. No. 6,299,308.

Figure 11:
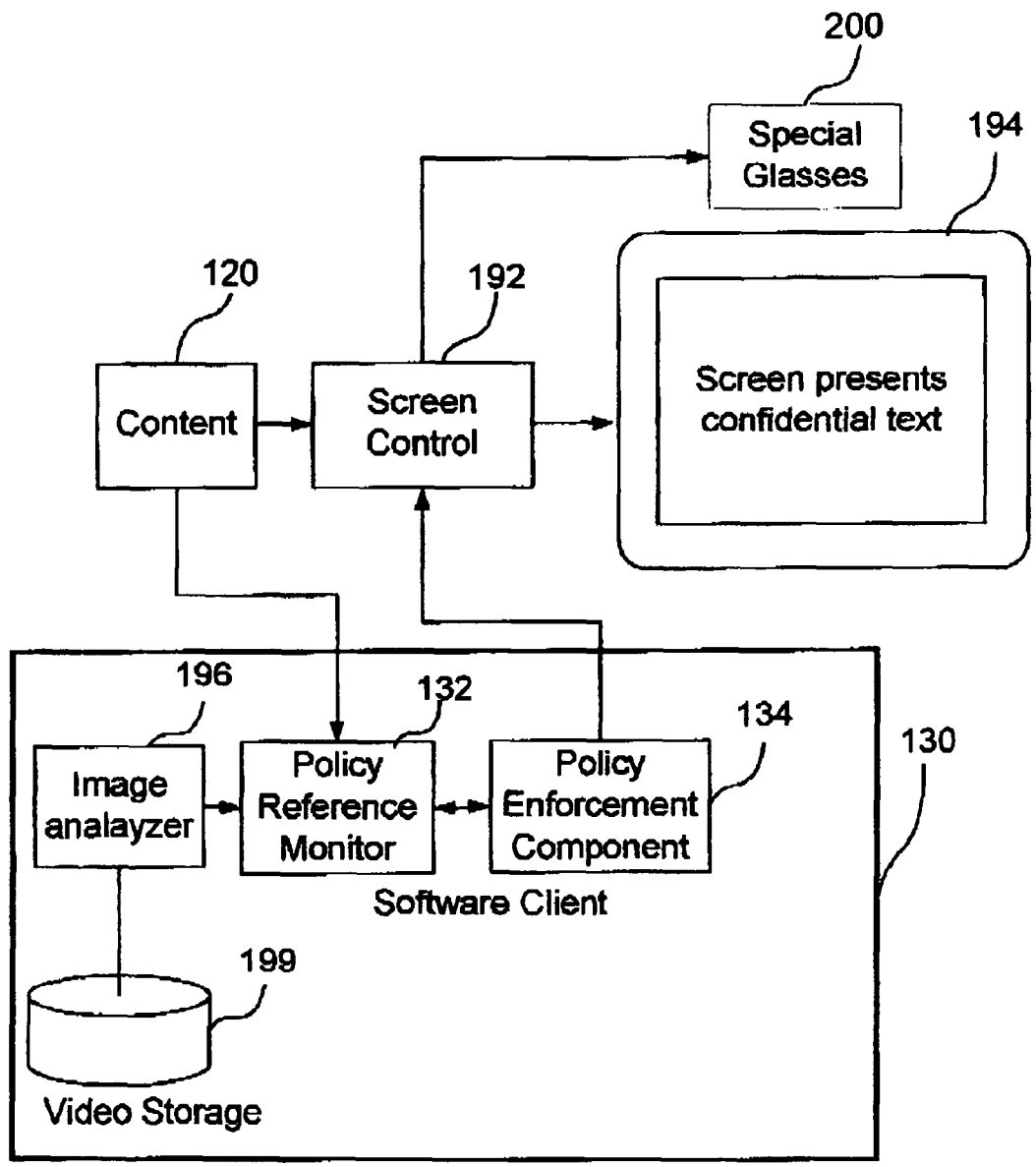
FIG. 11 illustrates a system, constructed and operative according to a preferred embodiment of the present invention, in which the protected information is presented on a computer screen in a manner that can be viewed only while using special glasses.
Figure 12:
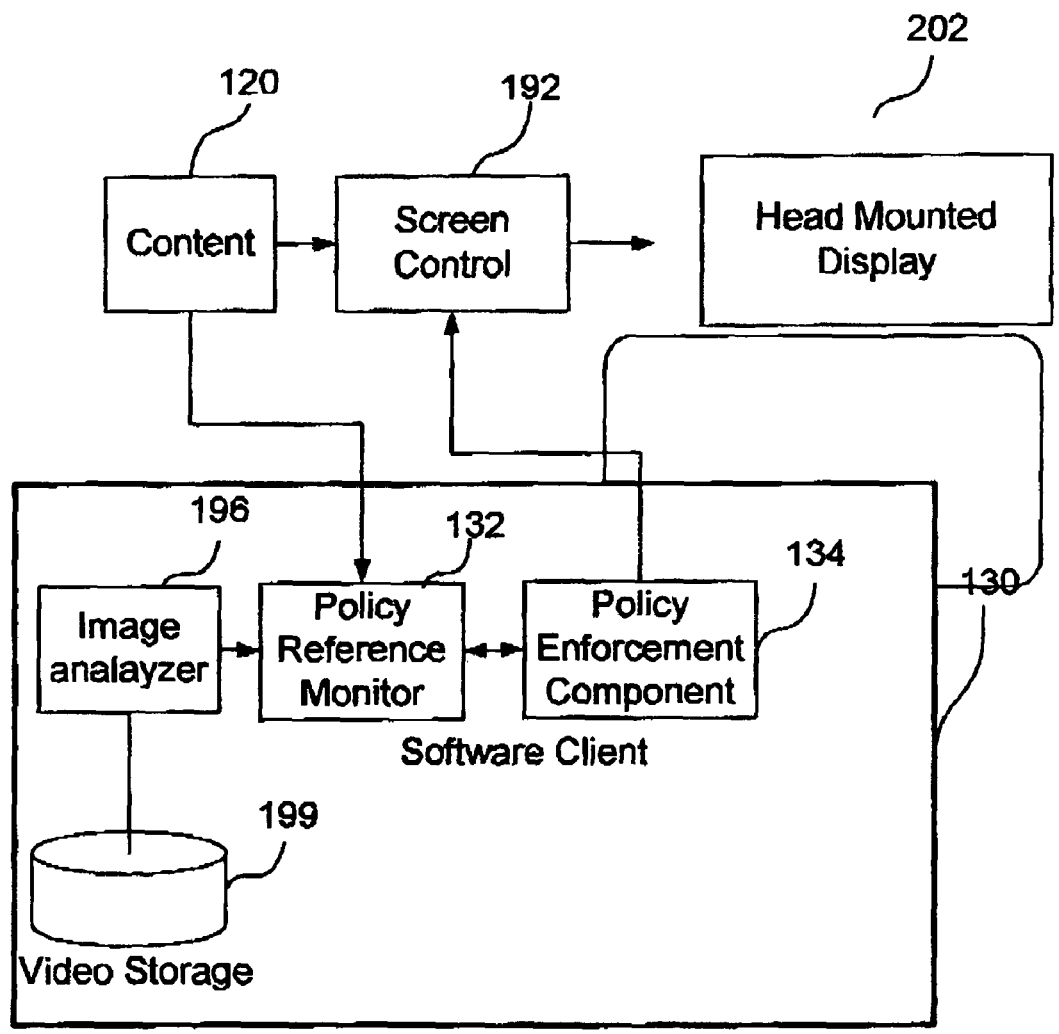
FIG. 12 illustrates a system, constructed and operative according to a preferred embodiment of the present invention, in which the protected information is preseted using a head-mounted display (HMD)

Manipulating the frame-rate of the screen: the frame-rate of the screen is set in a manner that is not synchronized with standard frame-rates of video cameras, in order to interfere video capturing. In particular, the frame-rate can be dynamically changed, in order to resist attempts of synchronization by a video recorder or an eavesdropper. Reference is now made to FIG. 11, which illustrates this method:

Allow viewing the protected content only with head-mounted display (HMD) or special glasses: In a preferred embodiment of the present invention, the document is presented on the screen in certain, very short, time intervals, while another visual information is presented on the screen during other time intervals, in a manner operable to interfere to normal viewing and/or photographing of the screen. In order to view the document, the user is required to use glasses that are equipped with shutters (similar to the kind used for 3D viewing). The shutters are opened only when the relevant text is displayed; thereby allow the user to view the document. Attempts to take a screen-shot without using the glasses will cause to camera to average two or more different frames, which greatly reduces the viewability of the information. In a preferred embodiment of the present invention, the system presents the information in a manner that can be viewed only with three-dimensional glasses. In a preferred embodiment of the present invention, the system is also equipped with a sensor, operable to detect that the user is wearing the glasses, or the head-mounted display, and allow to view the document only when the user is wearing the the glasses. In another preferred embodiment of the present invention, the the head-mounted display or the glasses are equipped with a device operable to identify the user using a biometric feature, e.g., according to the structure of the user's iris. Reference is now made to FIG. 11, which illustrates a system, substantially similar to the one illustrated in FIG. 10, in which the protected information is presented on a computer screen in a manner that can be viewed substantially only while using special glasses 200, and to FIG. 12, which illustrates a system, substantially similar to the one illustrated in FIG. 11, in which the protected information is presented only on a head-mounted display 202, thereby resisting attempts of screen-capture using a camera.

Utilizing a camera-detection sensor, operable to detect the presence of camera that can take screen-shots, and allow viewing the content only when such a camera does not exist. The method can be based on image analysis Allow viewing the protected content only while using specialized screens that restricting the viewing angle; thereby limit the locations from which the camera can take screenshots. This method can be used in conjecture with camera detection methods.

Constantly moving the text: In a preferred embodiment of the present invention, the text is constantly moving (e.g., rolling upward and/or performing small random motion), thereby reduces the quality of a stills picture taken Displaying the text against background that is designed in a manner that effectively reduces the quality of a picture taken by a standard camera.

In a preferred embodiment of the present invention, in cases in which highly protected information is processed on a workstation, the system requires the usage of a screen that is resisted to RF eavesdropping (commonly referred to as the "tempest attack" or "tempest eavesdropping") and optical eavesdropping. In general, LCD screens provide reasonable security level versus such attacks.

Figure 13:
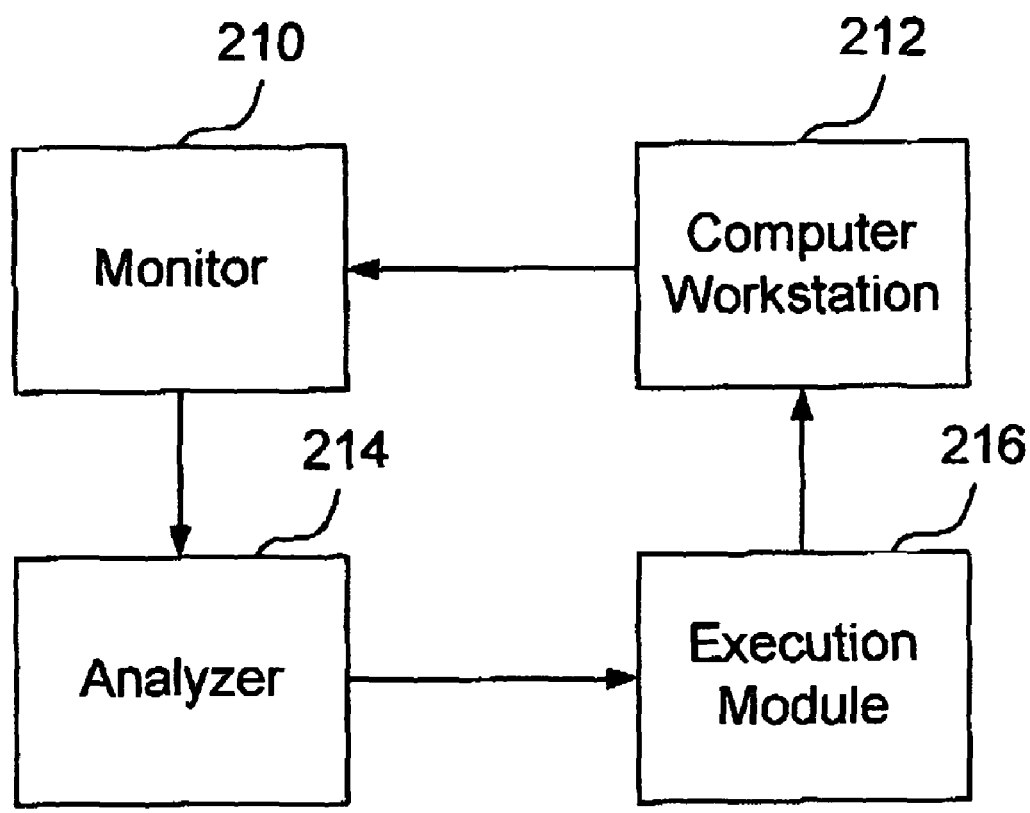
FIG. 13 illustrates a system for computer workstation based information protection, constructed and operative according to a preferred embodiment of the present invention.

Reference is now made to FIG. 13, which illustrate a system for computer workstation based information protection, constructed and operative according to a preferred embodiment of the present invention, the system comprising a monitor 210 for monitoring user's actions on the computer workstation 212, an analyzer 214 for analyzing the actions in respect to a pre-defined policy to determine whether the actions prejudice information to which the policy applies, and a policy execution module 216 for executing the policy in accordance with the results of the analysis, in order to prevent or modify or restrict or monitor or log the actions.

Figure 14:
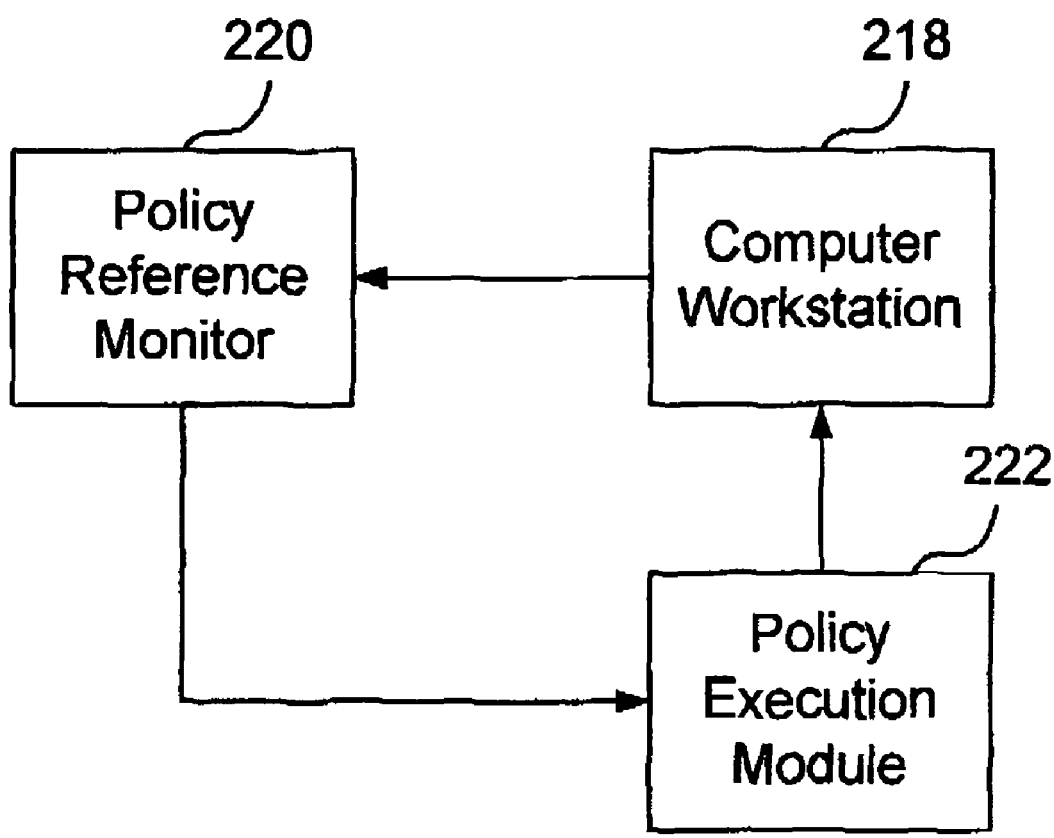
FIG. 14 illustrates a system for information protection, constructed and operative according to a preferred embodiment of the present invention, the information comprising information items for usage on a computer workstation.

Reference is now made to FIG. 14, which illustrates a system for information protection, constructed and operative according to a preferred embodiment of the present invention, the information comprising information items for usage on a computer workstation 218. The system comprising a policy reference monitor 220 for defining an information protection policy with respect to certain information item and determining the measures required to protect the information according to the policy, and a policy execution module 222 for allowing the usage on a computer workstation 218 of information comprising the items for which an information protection policy is defined only while the required measures are being applied.

Figure 15:
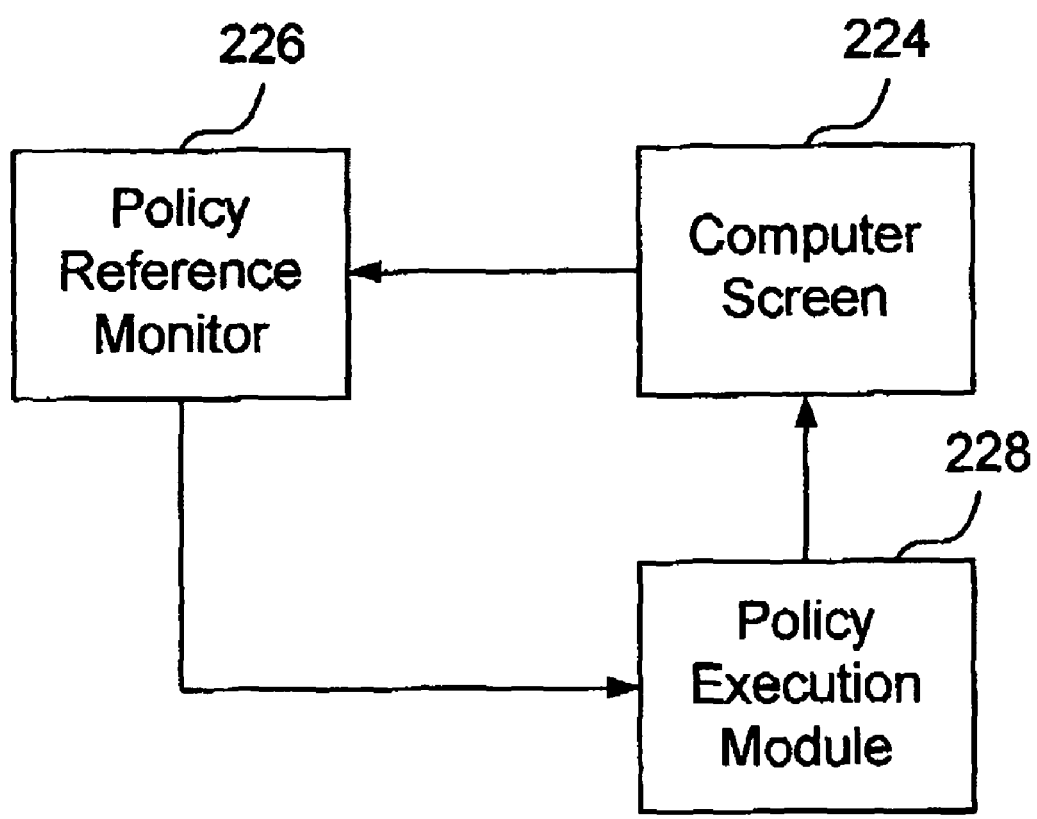
FIG. 15 illustrates a system for information protection, constructed and operative according to a preferred embodiment of the present invention, the information comprising information items for presentation on a computer screen.

Reference is now made to FIG. 15, which illustrates a system for information protection, constructed and operative according to a preferred embodiment of the present invention, the information comprising information items for presentation on a computer screen 224, the system comprising a policy reference monitor 226 for defining an information protection policy with respect to an certain information item and determining the measures required to resist screen capture according to the policy, and a policy execution module 228 for allowing presentation of information comprising items for which an information protection policy is defined on the computer screen 224 only while the required measures are being applied.

The present invention successfully addresses the shortcomings of the presently known configurations by providing a method and system for robust tracking and management of information and knowledge, which can efficiently serve digital information management, audit and control.

It is appreciated that one or more steps of any of the methods described herein may be implemented in a different order than that shown, while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirely by reference into the specification, to the same extent as if each individual publication, patent, or patent application was specifically and individually indicated to be incorporated herein by reference. In addition, citation or identification of any reference in this application shall not be construed as an admission that such reference is available a prior art to the present invention.

The invention claimed is:

1. A method for computer workstation based information protection, the method comprising:
   a) monitoring a user's actions on said computer workstation;
   b) detecting whether content in use at said workstation in association with said actions being monitored comprises confidential information, said detecting comprising said workstation performing a statistical analysis of said content in use by said user using identifiers from a content identifier database, said statistical analysis using said identifiers to associate said content with respective confidential information, said confidential information being associated with respective predefined policies;
   c) analyzing said monitored action with respect to a respective pre-defined policy associated with any confidential information identified by said analysis as being associated with said content in use at said workstation, to determine whether said actions prejudice said confidential information; and
   d) executing said policy in accordance with the results of said determination to control said actions; wherein said information protection comprises protecting information held within a software data processing application able to process said information, wherein said software data processing application authenticates itself to a server before at least some of the sessions wherein said authentication depends on a classification level assigned to said protected information, wherein connection to at least two servers are required in order to determine said policy and wherein said software data processing application is entangled with said server's software, such that a functioning stand-alone copy of said software data processing application does not exist.

2. A method according to claim 1, wherein said policy comprises restrictions on at least one of the following actions: print, save, copy, autosave, fax.

3. A method according to claim 1, wherein said monitoring said user's actions on said workstation comprises detection of indications of attempts at tampering.

4. A method according to claim 3, wherein said detection of indications of attempts at tampering comprises obtaining logical indications or statistical indications.

5. A method according to claim 3, wherein said detection of indications of attempts of tampering comprises detection of at least one un-certified add-in.

6. A method according to claim 5, wherein said detection includes noting that said un-certified add-in is hooked to events of a local operating system.

7. A method according to claim 3, wherein said detection of indications of attempts at tampering comprises detection of at least one debugging technique.

8. A method according to claim 7, wherein said debugging technique comprises use of any of: a debugger, a virtual machine, a software emulator, a software trap, and a remote administration tool.

9. A method according to claim 3, wherein said policy comprises restrictions of actions made available to said user upon said detection of indications of attempts of tampering.

10. A method according to claim 9, wherein said restrictions of user's actions upon said detection of indications of attempts of tampering comprise applying restrictions on actions within a software application operable to process said information.

11. A method according to claim 3, wherein said execution of said policy comprises performing at least one action upon detection of indications of attempts of tampering.

12. A method according to claim 11, wherein said actions comprise at least one of the following: encrypting at least one buffer, and encrypting at least one shared memory.

13. A method according to claim 11, wherein said actions comprise preventing the decryption of encrypted digital content.

14. A method according to claim 1, wherein said pre-defined policy is defined with respect to a software application on said user's workstation.

15. A method according to claim 1, wherein said policy comprises reporting about attempts to perform actions that do not comply with an organizational policy or about attempts to perform actions that are suspected to not comply with the organizational policy.

16. A method according to claim 1, wherein said policy comprises performing logging of attempts to perform actions that that do not comply or are suspected to not comply with the organizational policy.

17. A method according to claim 1, wherein said information protection comprises protecting information held within a software data processing application able to process said information.

18. A method according to claim 17, wherein said software data processing application operates in conjunction with a software client.

19. A method according to claim 17, wherein said software client is a tamper-resistant software client.

20. A method according to claim 17, wherein said software client is operable to monitor said user's actions and to execute said policy.

21. A method according to claim 17, wherein said software client is operable to detect information based on statistical identifiers residing in a specialized database.

22. A method according to claim 17, wherein said software client is further operable to detect events of said software application.

23. A method according to claim 22, wherein said events comprise events required for any of: printing said information; copying said information; storing said information, and displaying said information.

24. A method according to claim 17, wherein said software client comprises components that can be automatically replaced.

25. A method according to claim 17, wherein in accordance with said policy said protected information is encrypted utilizing the encryption capabilities of said software application.

26. A method according to claim 25, wherein said software application operable to process said information is any of: a word processing application; Microsoft "word"; Open office "word", and Star office "word".

27. A method according to claim 17, wherein said software application comprises a control flag imparting a status of either read only or lock to a corresponding file, and wherein file modification within said software application which is operable to process said information is disabled via said flag.

28. A method according to claim 27, wherein said disabling of said file modification is controlled by said policy.

29. A method according to claim 17, wherein said software client replaces the clipboard functionality of said software application thereby to process said protected information with a secure clipboard functionality.

30. A method according to claim 29, wherein said protected information copied into said secure clipboard is stored in an internal data structure inaccessible to other applications.

31. A method according to claim 17, wherein said software client is installed automatically from a remote server.

32. A method according to claim 31, wherein said installation of said software client utilizes anti-virus installation infrastructure.

33. A method according to claim 17, wherein updates of said software client utilize anti-virus update infrastructure.

34. A method according to claim 17, wherein at least part of the software code of said software client resides in an encrypted form.

35. A method according to claim 17, wherein at least part of the software code of said software client is attached to hardware of said computer workstation.

36. A method according to claim 17, wherein said software client is operable to automatically add information to said protected information in accordance with said policy.

37. A method according to claim 36, wherein said added information comprises any of: a document header; a document footer; and a textual disclaimer.

38. A method according to claim 17, wherein said client software is operable to open file that comprises said protected information only while connected to at least one server.

39. A method according to claim 38, wherein said servers enforce a policy with respect to said protected information.

40. A method according to claim 39, wherein said policy implies a set of restrictions regarding the usage of the said protected information.

41. A method according to claim 38, wherein at least two servers are operable to define said policy.

42. A method according to claim 32, wherein said server authenticates the integrity of said client by requiring a cryptographic hash of at least part of said client's software.

43. A method according to claim 42, wherein said cryptographic hash is with respect to a random address in said clients software.

44. A method according to claim 38, wherein said method comprises at least two levels of protection, and wherein said levels of protection are operable to be configured as a function of the secrecy of said protected information.

45. A method according to claim 44, wherein in the most secure of said levels of protection, said protected information can only be accessed while connected to said server.

46. A method according to claim 44, wherein in at least one of said levels of protection, said information can be accessed for a limited time after the connection with said server was terminated.

47. A method according to claim 44, wherein in at least one of said levels of protection, said information can be accessed until the end of a current login session.

48. A method according to claim 44, wherein in at least one of said levels of protection, said information can be unlimitedly accessed after the server approves said information.

49. A method according to claim 17, wherein said client software is operable to check that it is connected to a predetermined server before decrypting a file that comprise said protected information.

50. A method according to claim 49, wherein said servers enforce a policy with respect to said protected information, and wherein said policy comprises a set of restrictions regarding the usage of the said protected information.

51. A method according to claim 1, wherein said policy further comprising managing usage rights.

52. A method according to claim 51, wherein said usage rights are determined according to any of: the classification of the document; the classification level of the user, and the authentication level of the user.

53. A method according to claim 51, wherein said usage rights comprise any of: viewing at least part of said information; modifying at least part of said information; sending at least part of said information to a recipient; storing at least part of said information; storing at least part of said information by an application; storing at least part of said information by a file system; storing at least part of said information in a portable device; storing at least part of said information in a removable media; storing at least part of said information portable storage device that is connected to said workstation using a USB port; pasting at least part of said information into a document; printing at least part of said information; printing at least part of said information to file; printing at least part of said information to a fax, and printing a screen view document.

54. A method according to claim 51 wherein said policy further comprises definitions of actions to be performed.

55. A method according to claim 54, wherein said actions comprise any of: enabling usage of at least part of said information; disabling usage of at least part of said information; restricting the usage of at least part of said information, according to a pre-determined set of restrictions; reporting about the usage of at least part of said information, and monitoring the usage of at least part of said information.

56. A method according to claim 55, wherein said restriction of usage imposes requiring encryption of at least part of said protected information.

57. A method according to claim 56, wherein said required encryption is such that corresponding encrypted information can be decrypted only by a secure client.

58. A method according to claim 56, wherein said encryption of protected information further comprising encryption of a file comprising at least part of said protected information wherein said file is at least one of the following: temporary file and auto-recovery file.

59. A method according to claim 55, wherein said restriction of usage requires said protected information to reside on a secure server.

60. A method according to claim 59, comprising arranging a connection between said secure server and said workstation such that the transport between said secure server and said workstation is protected.

61. A method according to claim 60, wherein said protected transport comprises an encrypted transport.

62. A method according to claim 59, wherein said protected information further comprises a file comprising at least part of said protected information, wherein said file comprises any of temporary file and auto-recover file.

63. A method according to claim 1, wherein said authentication comprises any of: password based authentication; and network address based authentication.

64. A method according to claim 59, wherein said secure server employs cryptographic encryption of at least one file containing said protected information.

65. A method according to claim 59, wherein communication with said server is substantially transparent to said user.

66. A method according to claim 1, wherein said policy comprises adding forensic information to said protected information.

67. A method according to claim 1, wherein in the event of two or more conflicting policies being found, a policy comprising the union of restrictions of said policies is used.

68. A method according to claim 1, wherein controlling a user's action comprises at least one of: preventing said action, modifying said action, restricting, said action, monitoring said action, or logging said action.

69. A method for information protection, said information comprising information items, said information being for usage on a computer workstation, comprising:
  a) defining an information protection policy with respect to an information item, said defining comprising determining at least one measure, required to be enforced by said workstation, in said policy to protect said information item;
  b) using identifiers obtained from a content identifier database, said workstation performing a statistical analysis of content in use on said computer workstation to identify said information item as comprising confidential information to a given level of confidence, and
  c) allowing said usage on a computer workstation of content comprising said information item only while said required measures in said policy are being applied by said workstation in view of said level of confidence; wherein said information protection comprises protecting information held within a software data processing application able to process said information, wherein said software data processing application authenticates itself to a server before at least some of the sessions wherein said authentication depends on a classification level assigned to said protected information, wherein connection to at least two servers are required in order to determine said policy and wherein said software data processing application is entangled with said server's software, such that a functioning stand-alone copy of said software data processing application does not exist.

70. A method according to claim 69, wherein said information protection measures comprises protecting information within a client software application.

71. A method according to claim 70, wherein said protecting information within a client software application comprises disabling at least one of the controls of said application.

72. A method according to claim 69, wherein said information protection measures comprises encryption of the memory of a graphic card or a video card.

73. A method according to claim 69, wherein said information protection measures comprises forcing a video card or a graphic card to a mode that causes no meaningful information to be stored in said video card's memory.

74. A method according to claim 69, wherein said information protection measures comprises scanning at least one storage device and identifying the existence of pre-defined information objects.

75. A method according to claim 74, wherein said pre-defined information objects comprise confidential information objects.

76. A method according to claim 69, wherein said information protection policy comprises at least one rule regarding at least one event of at least one software application operable to handle said information.

77. A method for computer workstation based information protection, the method comprising:
  a) detecting an event occurring at said workstation, said event being associated with content;
  b) said workstation performing a statistical analysis of said content associated with said event to identify confidential information within said content, said statistical analysis utilizing an identifier extracted from a content identifier database, said statistical analysis providing said identification; and
  c) employing information protection based on an assessment of an importance of said event to protection of said confidential information, said assessment identifying at least one policy, wherein said information protection comprises protecting information held within a software data processing application able to process said information, wherein said software data processing application authenticates itself to a server before at least some of the sessions wherein said authentication depends on a classification level assigned to said protected information, wherein connection to at least two servers are required in order to determine said policy and wherein said software data processing application is entangled with said server's software, such that a functioning stand-alone copy of said software data processing application does not exist.

78. A method according to claim 77, further comprising: handling an event, said event being designated as directing information protection, and employing a said information protection technique in reaction to said event.

79. A method according to claim 78, wherein said event comprise any of: loading a local operating system; loading an application; user action; presenting a specific information into the system; an event generated by another system; suspicious activity; operating system time event; and a network time event.

80. A system for computer workstation based information protection, the system comprising:

A computer workstation comprising:
i) a monitor configured for monitoring a user's actions on said computer workstation, said actions being associated with content;
ii) an analyzer associated with a content identifier database, said analyzer configured for:
performing a statistical analysis of said associated content in use by said user using content identifiers from said database to identify confidential information in said content, said identifying being provided with a level of confidence; and
analyzing said actions with respect to a pre-defined policy associated with said identified confidential information to determine whether said actions prejudice said information; and
iii) a policy execution module configured for executing said policy in accordance with the results of said analysis, including said level of confidence, to control said actions in accordance with said policy; wherein said information protection comprises protecting information held within a software data processing application able to process said information, wherein said software data processing application is configured for authentication to a server before at least some of the sessions, wherein said authentication depends on a classification level assigned to said protected information, wherein connection to at least two servers are required in order to determine said policy and wherein said software data processing application is entangled with said server's software, such that a functioning stand-alone copy of said software data processing application does not exist.

81. A system according to claim 80, wherein said policy comprises restrictions on at least one of the following actions: print, save, copy, autosave, fax.

82. A system according to claim 80, wherein said monitoring said user's actions on said workstation comprises detection of indications of attempts at tampering.

83. A system according to claim 82, wherein said detection of indications of attempts of tampering comprises detection of at least one un-certified add-in.

84. A system according to claim 83, wherein said detection of indications of attempts at tampering comprises detection of at least one debugging technique.

85. A system according to claim 82, wherein said policy comprises restrictions of actions made available to said user upon said detection of indications of attempts of tampering.

86. A system according to claim 85, wherein said restrictions of user's actions upon said detection of indications of attempts of tampering comprise applying restrictions on actions within a software application operable to process said information.

87. A system according to claim 86, wherein said software data processing application operates in conjunction with a tamper-resistant software client.

88. A system according to claim 87, wherein said software client is operable to monitor said user's actions and to execute said policy.

89. A system according to claim 87, wherein said software client is operable to detect information based on statistical identifiers residing in a specialized database.

90. A system according to claim 87, wherein said software client is further operable to detect events of said software application.

91. A system according to claim 87, wherein said client software is operable to check that it is connected to a predetermined server before decrypting a file that comprise said protected information only while connected to at least one server.

92. A system according to claim 91, wherein said servers enforce a policy with respect to said protected information, and wherein said policy comprises a set of restrictions regarding the usage of the said protected information.

93. A system according to claim 87, wherein said software client replaces the clipboard functionality of said software application thereby to process said protected information with a secure clipboard functionality.

94. A system according to claim 87, wherein said software client is installed or updated automatically from a remote server.

95. A system according to claim 94, wherein said installation or updates of said software client utilize anti-virus installation infrastructure.

96. A system according to claim 94, wherein said software client is operable to automatically add information to said protected information in accordance with said policy.

97. A system according to claim 86, wherein said software application operable to process said information is any of: a word processing application; Microsoft "word", Open office "word", and Star office "word".

98. A system according to claim 80, wherein said policy further comprising managing usage rights.

99. A system according to claim 98, wherein said usage rights comprise any of: viewing at least part of said information; modifying at least part of said information; sending at least part of said information to a recipient; storing at least part of said information; storing at least part of said information by an application; storing at least part of said information by a file system; storing at least part of said information in a portable device; storing at least part of said information in a removable media; storing at least part of said information portable storage device that is connected to said workstation using a USB port; pasting at least part of said information into a document; printing at least part of said information; printing at least part of said information to file; printing at least part of said information to a fax, and printing a screen view document.

100. A system according to claim 80, wherein to control an action comprises at least one of: preventing said action, modifying said action, restricting, said action, monitoring said action, or logging said action.

101. A system for information protection, said information comprising information items, said information being for usage on a computer workstation, the system comprising:

A computer workstation comprising:
a) a policy reference monitor configured for identifying particular information items as requiring protection, defining respective information protection policies with respect to said identified information items, said defining comprising determining measures required to protect said information, said policy reference monitor further configured to place in a content identifier database an identifier for any such information for which a policy has been defined; and wherein, in the event of two or more conflicting policies being defined, a strictest one of the policies is identified and used;
b) a policy execution module configured for using said identifiers in a statistical analysis of content being used at said workstation to identify information items for which a policy has been defined, said identifying comprising providing a level of confidence, and for allowing said usage on a computer workstation of information comprising said items for which an information protection policy is defined only while said required measures are being applied in view of said level of confidence, wherein said information protection comprises protecting information held within a software data processing application able to process said information, wherein said software data processing application is configured for authentication to a server before at least some of the sessions, wherein said authentication depends on a classification level assigned to said protected information, wherein connection to at least two servers are required in order to determine said policy and wherein said software data processing application is entangled with said server's software, such that a functioning stand-alone copy of said software data processing application does not exist.

102. A method for computer workstation based information protection, the method comprising:
- a) monitoring a user's actions on said computer workstation;
- b) detecting whether content in use at said workstation in association with said actions being monitored comprises confidential information, said detecting comprising said workstation performing a statistical analysis of said content in use by said user using identifiers from a content identifier database, said statistical analysis using said identifiers to associate said content with respective confidential information, said confidential information being associated with respective predefined policies;
- c) analyzing said monitored action with respect to a respective pre-defined policy associated with any confidential information identified by said analysis as being associated with said content in use at said workstation, to determine whether said actions prejudice said confidential information; and
- d) executing said policy in accordance with the results of said determination to control said actions; wherein in the event of two or more conflicting policies being found, a policy comprising the union of restrictions of said policies is used, wherein said information protection comprises protecting information held within a software data processing application able to process said information, wherein said software data processing application authenticates itself to a server before at least some of the sessions wherein said authentication depends on a classification level assigned to said protected information, wherein connection to at least two servers are required in order to determine said policy and wherein said software data processing application is entangled with said server's software, such that a functioning stand-alone copy of said software data processing application does not exist.

* * * * *